US011827279B2

(12) United States Patent
Morgan et al.

(10) Patent No.: US 11,827,279 B2
(45) Date of Patent: Nov. 28, 2023

(54) AERODYNAMIC MUD FLAP

(71) Applicant: COMPAGNIE GENERALE DES ETABLISSEMENTS MICHELIN, Clermont-Ferrand (FR)

(72) Inventors: Justin Morgan, Anderson, SC (US); Parker Baxter, Greenville, SC (US); Chinglin Pan, Mauldin, SC (US); Calvin Rhett Bradley, Greenville, SC (US); Charles Andrew McPillan, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 17/494,576

(22) Filed: Oct. 5, 2021

(65) Prior Publication Data
US 2022/0024522 A1 Jan. 27, 2022

Related U.S. Application Data

(63) Continuation of application No. 16/652,015, filed as application No. PCT/US2018/053761 on Oct. 1, 2018, now Pat. No. 11,155,309.

(30) Foreign Application Priority Data

Sep. 29, 2017 (WO) ................ PCT/US2017/054514

(51) Int. Cl.
*B62D 25/18* (2006.01)
(52) U.S. Cl.
CPC .................................. *B62D 25/188* (2013.01)
(58) Field of Classification Search
CPC .... B62D 25/188; B62D 25/16; B62D 25/161; B62D 25/18; B62D 35/001; B62D 35/02
See application file for complete search history.

(56) References Cited

U.S. PATENT DOCUMENTS 3,337,238 A 8/1967 Weasel, Jr.
3,549,171 A 12/1970 Manuel
(Continued)

FOREIGN PATENT DOCUMENTS

EP 2100800 A1 9/2009
FR 1575907 A 7/1969
GB 2300396 A 11/1996

OTHER PUBLICATIONS

International Search Report and Written Opinion for PCT/2018/053761 dated Jan. 22, 2019.
(Continued)

*Primary Examiner* — Steve Clemmons
(74) *Attorney, Agent, or Firm* — Hahn Loeser & Parks LLP; Bret A. Hrivnak

(57) ABSTRACT

Embodiments include a mud flap having a barrier section configured to intercept and deflect matter discharged from the tire when rotating during vehicle operation. The barrier section including a plurality of horizontal louvers, each horizontal louver forming an elongate member having a length extending primarily in a direction of the mud flap width, where the plurality of horizontal louvers are spaced apart in the direction of the mud flap height in the form of an array, where the plurality of horizontal louvers are configured to intercept and deflect matter of a minimum size traveling along any linear trajectory path from the outer circumference of the tire/wheel assembly towards the front side of the mud flap while substantially maximizing the spacing between adjacent louvers to minimize aerodynamic drag. Other embodiments provide a method of using the mud flap.

20 Claims, 10 Drawing Sheets

(56) References Cited

U.S. PATENT DOCUMENTS

| | | |
|---|---|---|
| 3,582,108 A | 6/1971 | Carlton |
| 3,684,312 A | 8/1972 | Evans |
| 3,713,669 A | 1/1973 | Evans |
| 3,874,697 A | 4/1975 | Thompson |
| 4,007,944 A | 2/1977 | Dingess |
| 4,165,092 A | 8/1979 | Herlein |
| 4,627,631 A | 12/1986 | Sherman |
| 5,044,667 A | 9/1991 | Manning |
| 5,273,318 A | 12/1993 | Nakayama et al. |
| 5,366,247 A | 11/1994 | Fischer |
| 5,564,750 A | 10/1996 | Bajorek et al. |
| 5,833,283 A | 11/1998 | Shaw |
| 6,799,782 B2 | 10/2004 | Jain et al. |
| 6,851,717 B1 | 2/2005 | Anderson |
| 7,931,302 B2 | 4/2011 | Vaughn |
| 8,287,001 B2 | 10/2012 | Uhl et al. |
| 8,579,314 B2 | 11/2013 | Prazen et al. |
| 8,777,270 B2 | 7/2014 | Kim et al. |
| 9,004,538 B2 | 4/2015 | Eklund et al. |
| 9,027,983 B2 | 5/2015 | Butler et al. |
| 9,221,390 B1 | 12/2015 | Begley |
| 9,284,000 B1 | 3/2016 | Smith |
| 10,611,326 B2 | 4/2020 | Mcneilus et al. |
| 11,155,309 B2 | 10/2021 | Morgan et al. |
| 2002/0043797 A1 | 4/2002 | Cicansky |
| 2003/0141713 A1 | 7/2003 | Morin et al. |
| 2013/0320658 A1 | 12/2013 | Eklund et al. |
| 2018/0043945 A1 | 2/2018 | Wiegel |

OTHER PUBLICATIONS

International Search Report and Written Opinion for PCT/2017/054514 dated Jun. 20, 2018.

International Search Report and Written Opinion for PCT/2017/054520 dated Jun. 13, 2018.

AERODYNAMIC MUD FLAP

CROSS-REFERENCE TO RELATED APPLICATIONS

This patent application is a continuation of U.S. patent application Ser. No. 16/652,015, filed Mar. 27, 2020 with the U.S. Patent Office, and claims priority to, and the benefit of, U.S. patent application Ser. No. 16/652,015, filed Mar. 27, 2020 with the U.S. Patent Office, International patent application no. PCT/US2018/053761, filed Oct. 1, 2018 with the U.S. Patent Office (as a Receiving Office), and International patent application no. PCT/US2017/054514, filed Sep. 29, 2017 with the U.S. Patent Office (as a Receiving Office), where each such prior patent application is hereby incorporated by reference.

BACKGROUND

Field

Embodiments of this disclosure relate generally to mud flaps for use on wheeled vehicles, such as trucks, semi tractors and trailers.

Description of the Related Art

Mud flaps are employed to form a barrier into which matter thrown rearward from a rotating tire is cast to protect any trailing vehicle. Due to the importance of improving fuel consumption to reduce operational costs, there is a need to provide mud flaps that improve aerodynamic performance, such as by reducing or minimizing aerodynamic drag, without notably reducing the capability of the mud flap to operate as a barrier.

SUMMARY

Embodiments of the disclosure include a mud flap for a vehicle and methods of using a mud flap.

In particular embodiments, the mud flap is configured for installation in a mounted position on a vehicle adjacent a tire/wheel assembly to intercept and deflect matter being projected by the tire/wheel assembly from an outer circumference of the tire/wheel assembly and along any of a plurality of linear trajectory paths tangent to the outer circumference of the tire when the tire/wheel assembly is in rotation during vehicle operation and to permit the passage of air flow through the mud flap during vehicle operation to prevent the generation of elevated aerodynamic drag. The mud flap includes a height, a width, and a thickness, where in the mounted position the height extends primarily in a vertical direction, the width extending perpendicular to the height, the thickness of the mud flap being defined by a front side and a rear side of the mud flap, the front side facing the tire/wheel assembly and configured to engage the matter being projected by the rotating tire/wheel assembly and the rear side forming an outlet for the passage of air flow through the mud flap. The mud flap includes a barrier section configured to intercept and deflect matter projected from an outer circumference of the tire when rotating during vehicle operation, the barrier section including a plurality of horizontal louvers, each horizontal louver forming an elongate member having a length extending primarily in a direction of the mud flap width, where the plurality of horizontal louvers are spaced apart in the direction of the mud flap height in the form of an array, the spacing between adjacent to horizontal louvers within the plurality of horizontal louvers increasing with increasing height of the mud flap. Each horizontal louver has a width and a thickness, the horizontal louver width extending perpendicular to the horizontal louver thickness and being greater than the horizontal louver thickness, both the horizontal louver width and the horizontal louver thickness extending perpendicular to a horizontal louver length, where a centerline of the horizontal louver thickness extends longitudinally at an inclination angle relative to a direction of the mud flap thickness, such that a bottom of the horizontal louver partially faces downward and partially faces the front side of the mud flap. The plurality of horizontal louvers are configured to intercept and deflect matter of a minimum size traveling along any linear trajectory path from the outer circumference of the tire/wheel assembly towards the front side of the mud flap while substantially maximizing the spacing between adjacent louvers to minimize aerodynamic drag.

In particular embodiments a method of using a mud flap on a vehicle having a tire/wheel assembly includes providing a mud flap in a mounted position on the vehicle adjacent to the tire/wheel assembly, the mud flap configured to intercept and deflect matter being projected by the tire/wheel assembly from an outer circumference of the tire/wheel assembly and along any of a plurality of linear trajectory paths tangent to the outer circumference of the tire when the tire/wheel assembly is in rotation during vehicle operation and to permit the passage of air flow through the mud flap during vehicle operation to prevent the generation of elevated aerodynamic drag. It is appreciated that the mud flap may form any mud flap contemplated herein, including the mud flap described in the preceding paragraph, for example.

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF THE DRAWINGS

Figure 9:
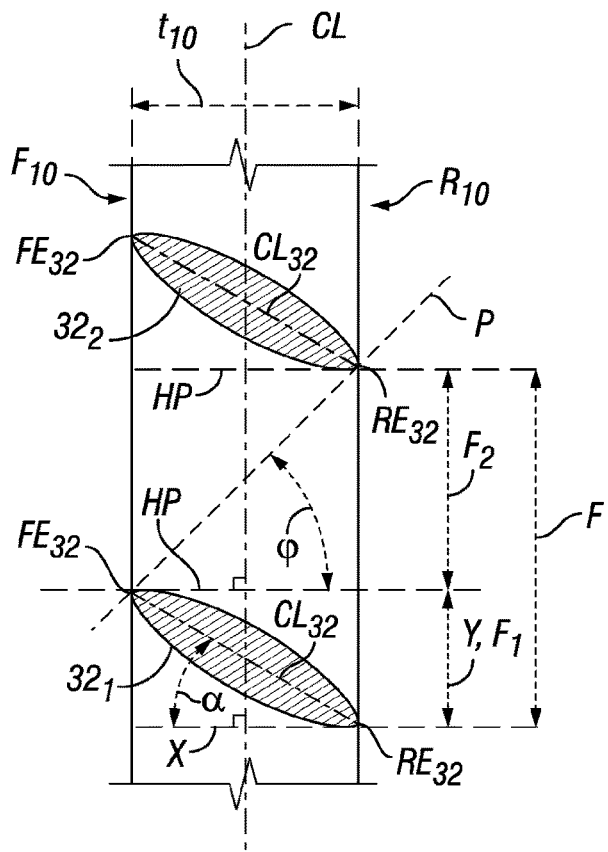
FIG. 9 is an enlarged view of FIG. 8 at location 9, showing adjacent horizontal louvers with points of intersection along exterior surfaces (respective front and rear exterior surfaces) of adjacent louvers aligned along a trajectory line.
Figure 10:
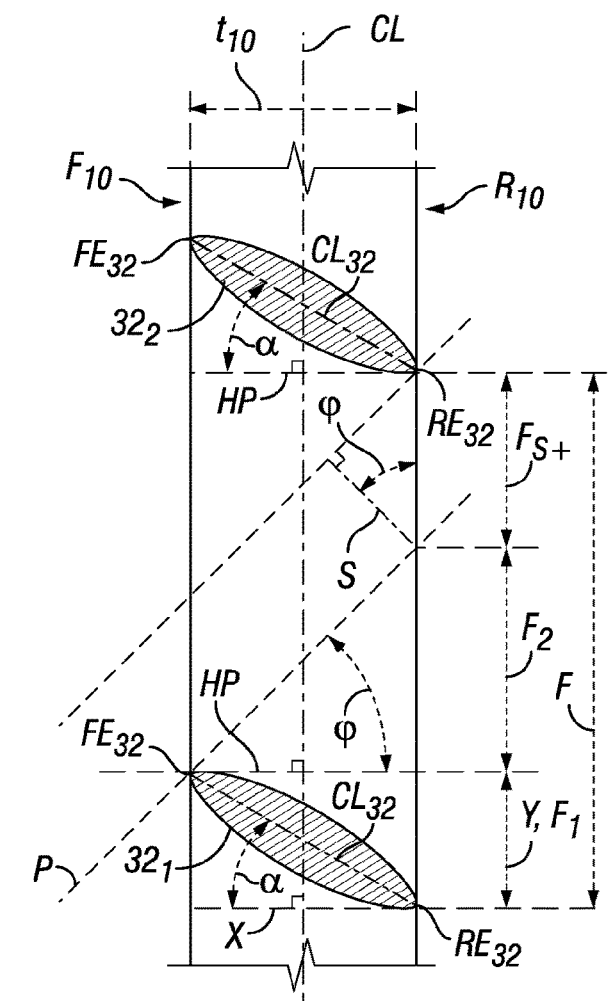
Figure 11:
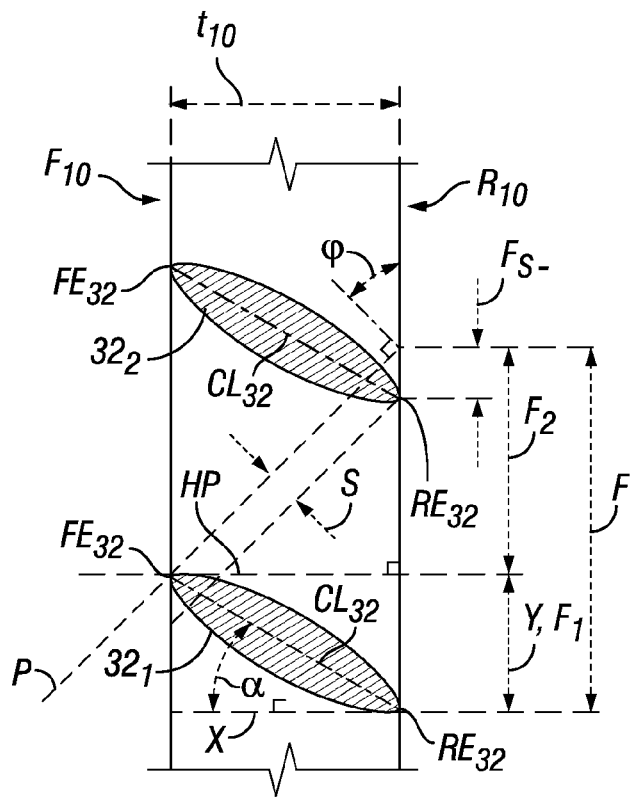
Figure 13:
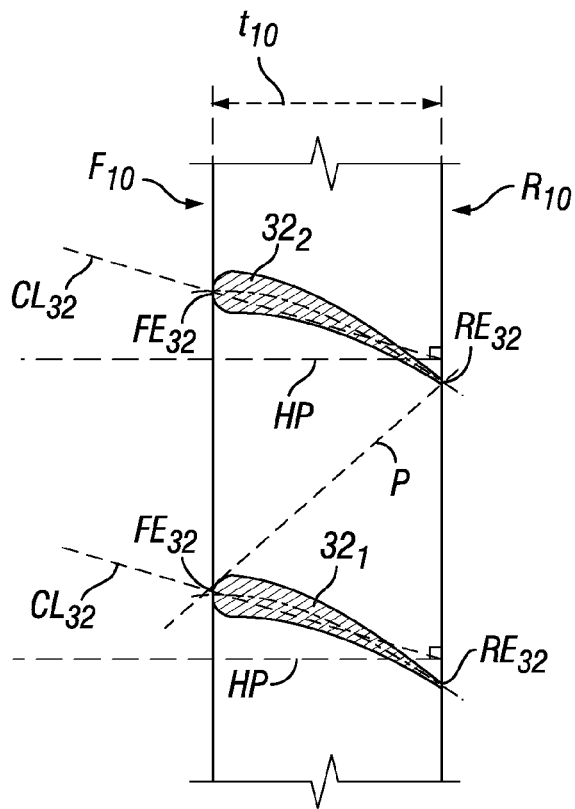
Figure 12:
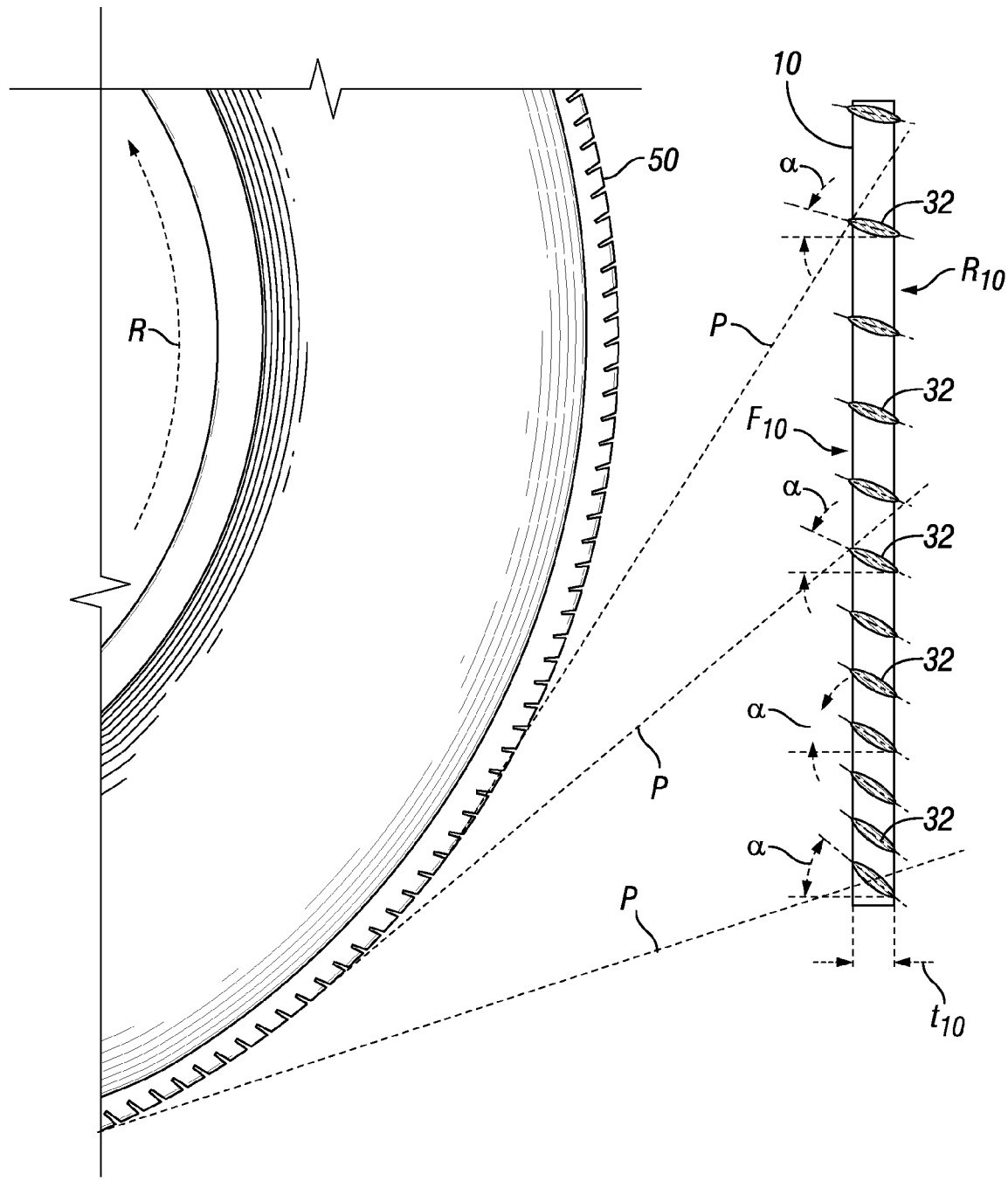
Figure 14:
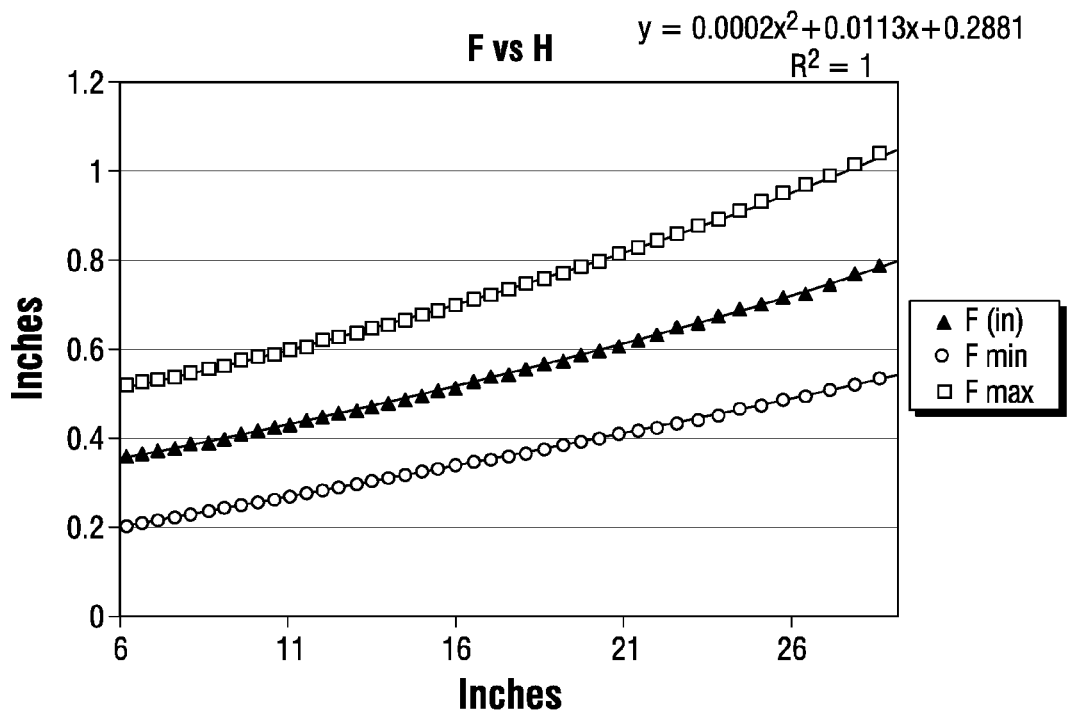
Figure 15:
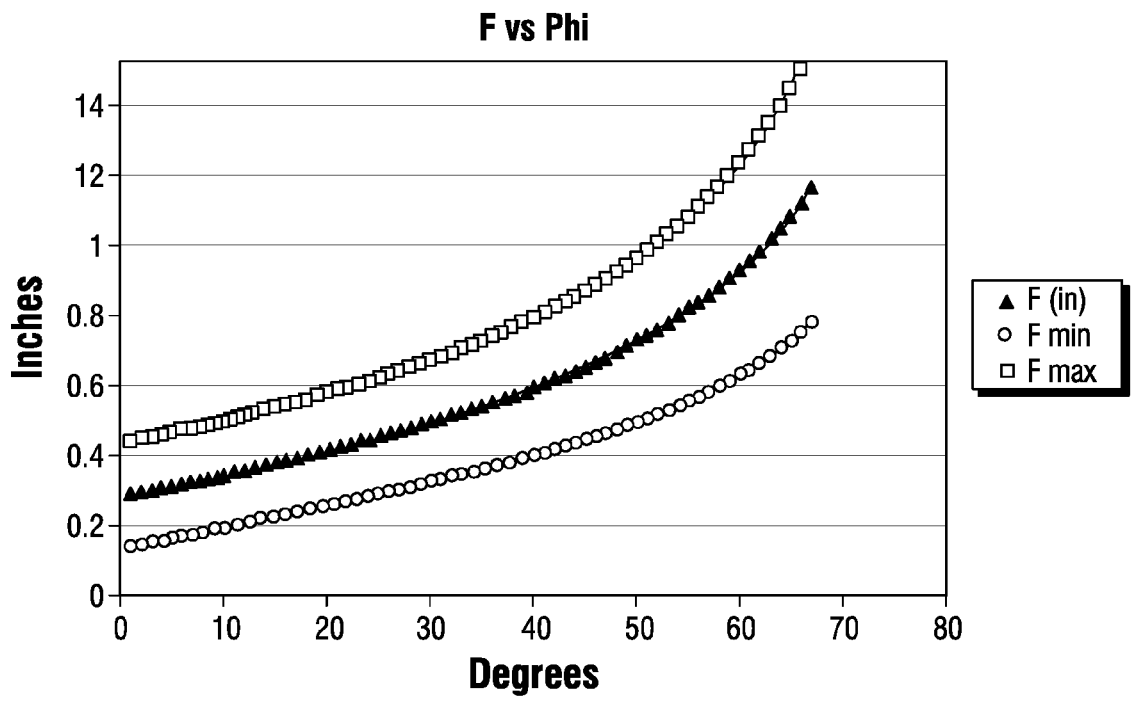

FIG. 10 is a side elevational view showing adjacent horizontal louvers in an alternative arrangement to those shown in FIG. 9, where points of intersection along exterior surfaces (respective corresponding leading and trailing edges) of the adjacent horizontal louvers are spaced apart relative to a trajectory line to provide a spaced opening configured to permit certain matter to pass within the spaced opening while operating as a barrier to intercept and deflect matter larger than the spaced opening;

FIG. 11 is a side elevational view showing adjacent horizontal louvers in an alternative arrangement to those shown in FIGS. 9 and 10, where points of intersection along exterior surfaces (respective corresponding leading and trailing edges) are spaced apart relative to a trajectory line to provide a permissible overlap of the adjacent horizontal louvers;

FIG. 12 is a side elevational view of a rotating tire and a sectional view of a plurality of horizontal louvers arranged in an array in a vertical arrangement where the inclination angle of the louvers decreases with increased positional elevation along the mud flap height;

FIG. 13 is a side elevational view similar to FIG. 9 showing adjacent horizontal louvers with points of intersection along exterior surfaces (respective leading and trailing edges) aligned along a trajectory line in accordance with another embodiment;

FIG. 14 is a chart showing a non-linear relationship between increasing adjacent louver spacing and increasing vertical location along a mud flap height; and, FIG. 15 is a chart showing a non-linear relationship between increasing adjacent louver spacing and increasing linear trajectory path angle from a rotating tire of a tire/wheel assembly.

DETAILED DESCRIPTION OF PARTICULAR EMBODIMENTS

This disclosure describes aerodynamic mud flaps for use wheeled vehicles. To improve aerodynamic performance, such as by the reduction or minimization of aerodynamic drag, openings are formed in the mud flap to allow airflow to pass through the mud flap during vehicle movement while still preventing the passage of certain matter through mud flap. In certain instances, these openings can be described as forming the spacing between adjacent elongated members referred to herein as horizontal louvers. Without making certain alterations, simply providing openings in the mud flap creates an opportunity for matter thrown rearward from a forward rotating tire to pass through any such opening, reducing the effectiveness of the mud flap to operate as a barrier. Therefore, the mud flap may be further adapted to better operate as a barrier, where both aerodynamic and barrier capabilities are generally maximized.

An improved mud flap can be described as having a height, a width, and a thickness. In an intended mounted arrangement on a vehicle, the height extends primarily in a vertical direction, the width extending perpendicular to the height, and the thickness extending perpendicular to both the height and the width. The thickness can be described as being less than each of the height and width, and in particular instances, substantially less than each of the height and width. The mud flap thickness extends from a front side to a back side of the mud flap.

Optionally, in particular instances, the mud flap includes a mounting section. The mounting section is configured to facilitate mounting of the mud flap to a vehicle and adjacent to a tire, such as may be mounted on a wheel to form a tire/wheel assembly. It is appreciated that the mounting section may be located anywhere on the mud flap, but commonly, it is located at or near the top of the mud flap, where the top of the mud flap connotes the maximum height of the mud flap in an elevational sense. The mounting section may include any desired mechanism to facilitate attachment of the mud flap to a vehicle. For example, in certain instances, the mounting section includes a first set of mounting features, configured to facilitate attachment of the mud flap to a mounting structure on the vehicle, such as by way of a first set of mounting orifices configured to receive a fastening member, such as a bolt or screw, for example. Any such mounting feature may form a recess or aperture to facilitate attachment of the mud flap to the vehicle. An aperture may be configured to receive some fastening member. A recess forms an indentation, such as to indicate where an aperture may be formed for mounting purposes, such as when the recesses represent a pre-existing pattern for mounting the mud flap to a particular set of mounting orifices on the vehicle.

The mud flap further includes a barrier section. The barrier section is configured to intercept and deflect matter discharged from a rotating tire during vehicle operation. Such matter may be any matter that may be found on a ground surface, such as road debris, stones, and water (which may take the form of water spray). When a mounting section is present, the mounting section and the barrier section may be arranged at different heights along the mud flap height. In certain instances, the barrier section is located below the mounting section, in relation to the mud flap height. In other words, the mounting section and the barrier section are arranged at different heights along the mud flap height, except that there may be overlap between the sections along the height.

In certain instances, the barrier section can be described as having a plurality of elongate openings extending primarily in the direction of the mud flap width (that is, primarily in a widthwise direction of the mud flap). Primarily in a direction of the mud flap width means a direction biased less than 45 degrees relative to the direction of the mud flap width. Adjacent elongate openings within the plurality of elongate openings are spaced apart by a particular distance, such as to balance the need to maximize the spacing to provide increased air flow through the mud flap against the need to minimize the spacing to prevent the passage of certain matter projected from a tire. Therefore, due to the trajectory of matter being expelled from the tire at different locations about the outer periphery of an annular tire tread (the tire tread forming an outer annular periphery around the tire), whether such trajectory is linear or arcuate, to balance air flow through the mud flap while also maintaining desired barrier capabilities, narrower elongate openings are provided at lower elevations along the mud flap while greater elongate openings are provided at higher elevations along the mud flap.

In particular instances, the barrier section includes a plurality of horizontal louvers, each horizontal louver forming an elongate member having a length extending primarily in a direction of the mud flap width. Primarily in a direction of the mud flap width means a direction biased less than 45 degrees relative to the direction of the mud flap width. The plurality of horizontal louvers are spaced apart in the direction of the mud flap height in the form of an array. These spacings represent an exemplary embodiment of the elongate openings more generally discussed in the prior paragraph, as elongate openings may be provided without the need for horizontal louvers. While the horizontal louvers are spaced apart to promote improved aerodynamic performance, the horizontal louvers are also oriented and arranged to eliminate any see-through opening for any matter to pass or to instead provide some amount of permissible see-though opening representing a maximum see-through opening to prevent matter sized greater than the see-through opening to pass between the adjacent horizontal louvers when directed rearward along a trajectory path from a forward rotating tire, that is, as a vehicle is traveling in a forward direction. For design purposes, this trajectory path may be linear (straight-line) or non-linear or arcuate. It has been determined that due to the close spacing between a mud flap and a tire for which the mud flap offers protection, for any anticipated over the road rotational speed of the tire, a linear trajectory is a good approximation for the trajectory of matter extending from the tire and to the mud flap, as in many instances a linear or slightly arcuate trajectory is provided within the range of anticipated rotational speeds (when vehicle is traveling 10 to 65 miles per hour and when spacing between tire and mud flap is 4 to 10 inches). In instances where the trajectory path is linear, the trajectory path forms a line tangent to the outer surface of the tire tread in a direction of forward tire rotation. In instances where the trajectory path is non-linear, while the trajectory may initially extend in a direction tangent to the tire tread, the path may decrease elevationally to form a slightly arcuate path. Any of these trajectories may be employed for mud flap design purposes, taking into account the type of matter, its size, and weight, as well as any range of rotational tire speeds.

Because the angle at which matter traveling along these trajectory paths are low when engaging lower portions of the mud flap and higher when engaging higher portions of the mud flap, greater spacings between adjacent horizontal louvers is acceptable at higher locations along the mud flap. Accordingly, in certain instances, the spacing between adjacent horizontal louvers within the array increases as the position of each horizontal louver in the array is arranged higher along the mud flap height away from a bottom and towards a top of the mud flap. More generally, it can also be stated that, on average, the spacing increases with increasing horizontal louver location along the mud flap height for all horizontal louvers arranged within the barrier section, which accounts for minor deviations from the generally increasing spacing arise within the array. While any desired spacings may be employed, in certain exemplary instances, the spacing between adjacent horizontal louvers varies from 0.1 to 0.5 inches, from the bottom to the top of the array. In more specific instances, the spacing between adjacent horizontal louvers varies from 0.1 and 0.2 inches at the bottom of the array to 0.35 to 0.5 inches at the top of the array. These spacing dimensions identified are measured in the direction of the mud flap height, or, stated differently, in a direction normal to the direction of the mud flap thickness (the direction of minimum mud flap thickness).

In addition to this increased spacing between adjacent horizontal louvers, horizontal louvers are arranged biased to the direction of the mud flap thickness, or, described differently, biased relative to horizontal, for the purpose of directing the bottom of each horizontal louver partially towards a front side of the mud flap, as well as directionally closer to being normal to a target trajectory path along which matter travels rearward from the forward rotating tire, where the front side of the mud flap is intended to face a rear side of a tire mounted on a vehicle. In doing so, it follows that each horizontal louver within the array can be described as having a width and a thickness, the width being greater than the thickness and extending perpendicular to the thickness. Both the width and the thickness extend perpendicular to the horizontal louver length, where the width extends at an angle (also referred to as an inclination angle herein) relative to the direction of the mud flap thickness or to horizontal (that is, a direction parallel to the ground plane), where the angle is greater than zero degrees and in particular instances less than 90 degrees. In other words, the width extends partially in a direction of the mud flap height and partially in a direction of the mud flap thickness. The use of such angled or biased horizontal louvers provides additional benefits over the benefits attained when increasing elongate openings (spacings) with increasing elevational location along the mud flap height.

In certain instances, when arranging adjacent horizontal louvers closer due to a reduced spacing and/or when increasing the inclination angle by which the width is biased to the direction of the mud flap thickness, a front, or front edge, of a first horizontal louver is arranged elevationally higher than a rear, or rear edge, of a second horizontal louver, the second horizontal louver being arranged adjacent to and elevationally above the first horizontal louver. The front edge is also referred to herein as a leading edge, while the rear edge is also referred to herein as a trailing edge. In such arrangements, each of the front and front edge is arranged along a front half of the horizontal louver associated with a front half of the louver width while each of the rear and rear edge is arranged along a rear half of the horizontal louver associated with a rear half of the louver width. The front half is arranged closest to a front side of the mud flap while the rear half is arranged closest to the rear side of the mud flap. In combination, the inclination angle by which the widthwise direction of each horizontal louver is biased relative to the mud flap thickness or to horizontal (that is, a horizontal plane), and the spacing between adjacent horizontal louvers within the plurality of louvers in the barrier section are each selected such that the plurality of horizontal louvers (the array) eliminates or minimizes any see-through opening through which matter (having a width) traveling along a straight-line trajectory rearward from a forward-rotating tire would otherwise pass, the straight-line trajectory being tangent to an outer surface of the tire tread (that is, an outer radial surface associated with an outer circumference of the tire tread). It is appreciated that an outer surface or outer circumference of the tread may form a portion of the outer, ground-contacting outer surface of the tread or any void extending into the tread thickness from the outer, ground-contacting outer surface. A void may form any desired void, such as any groove or sipe. However, when eliminating the see-through along the linear trajectory path, over-correcting by creating a notable overlap between adjacent horizontal louvers will reduce aerodynamic performance by increasing aerodynamic drag with a reduction in frontal see-through. Frontal see-through refers to the straight-line see-through extending in the direction of the mud flap thickness from the front side to the rear side of the mud flap, as opposed to straight-line see-through as observed along a linear trajectory path extending from an outer circumference of the tire. In other words, see-through relative to a linear trajectory path extending substantially tangent to an outer circumference of a tire is measured in the directions perpendicular to this path, while frontal see-through is measured in the directions perpendicular to the direction of the mud flap thickness, which, when mounted on a vehicle, is a horizontal direction.

In furtherance of this purpose, it is appreciated that the inclination angle by which the width of each adjacent horizontal louver extends relative to the direction of the mud flap thickness or to horizontal will depend on the width of the horizontal louvers, the spacing between adjacent louvers, and the distance by which the mud flap is intended to be installed from the tire. In certain embodiments introduced below, equations are introduced below that create an association of these parameters. In certain instances, the inclination angle of each horizontal louver of the plurality of horizontal louvers is substantially the same. In other instances, the inclination angle decreases with increasing mud flap height. In other words, the inclination angle by which the width is biased increases the higher a horizontal louver is located along the height of the mud flap. This reduces the aerodynamic drag at higher elevations along the mud flap where horizontal louvers are more horizontal as they are biased less relative to horizontal with a lower inclination angle. This lower inclination angle is achievable due to the linear trajectory path along which matter is cast tangent from a radially outer surface along the circumference of the tire. For a lower trajectory path, where the trajectory path intersects the mud flap elevationally at a lower location along the mud flap height, a greater inclination angle is desired in these embodiments to reduce see-through along the trajectory path. As a result, the greater inclination angle permits greater spacing between horizontal louvers. For a higher trajectory path, where the trajectory path intersects the mud flap elevationally at a higher location along the mud flap height, a lower inclination angle is desired in these embodiments to reduce see-through along the trajectory path. As a result, the greater inclination angle permits greater spacing between horizontal louvers. In these embodiments, for the plurality of horizontal louvers, the widths of the horizontal louvers and the spacing between the horizontal louvers may vary or remain the same.

With regard to spacing, generally, the lower a horizontal louver is located along the mud flap, the closer the straight-line trajectory of matter thrown from the tire is to horizontal (that is, parallel to a ground plane). Therefore, in instances when the inclination angle by which the width of each adjacent horizontal louver extends is the same, for purposes of blocking passage of any matter travelling along a trajectory path through the space between adjacent horizontal louvers (that is, reducing see-through along the path), the closer a horizontal louver is to the bottom of the mud flap, the closer the spacing between adjacent horizontal louvers and/or the greater the width of each adjacent horizontal louver. By way of example, in certain instances, where the width of each horizontal louver in the plurality of horizontal louvers is substantially the same (constant) and the inclination angle by which each such horizontal louver is inclined relative to horizontal is substantially the same (constant), the width is 0.25 to 1 inch, or in more particular instances, substantially 0.375 inches, and the inclination angle is an angle ranging from 0 to 50 degrees, or in more particular instances from 15 to 45 degrees or an angle of substantially 30 degrees. In such instances, the mud flap may be installed a particular distance between the mud flap and the tire, such as distance from 4 to 10 inches, or, in more particular instances, from 6 inches to 8 inches. Also, in such instances, the spacing between adjacent horizontal louvers varies from 0.1 and 0.2 inches at the bottom of the array to 0.35 to 0.50 inches at the top of the array. These mud flaps may be used on any wheeled vehicle. For example, these mud flaps may be used on over-the-road vehicles, such as tractors and trailers, which employ tires having inflated diameters generally ranging from 0.25 meters (m) to 1.25 m.

With regard to the size of the spacing between adjacent horizontal louvers, it is appreciated that certain matter may be permitted to pass through each spacing (passage), as it has been observed that due to the air flowing through the spacing and due to the general downward direction of the passage formed by way of the spacing between adjacent horizontal louvers, such matter will be directed downwardly towards a ground surface. This downward direction is better provided when the spacing between adjacent horizontal louvers is closer (lower on the mud flap). It is noted that the air flow is not only directed downwardly by way of the downwardly directed passage, the air flow is characterized as having increased speeds resulting in lower air pressures. Therefore, by downwardly angling the passaged formed by the spacing between adjacent horizontal louvers on the back side of the mud flap, passage of matter is directed downwardly to provide additional barrier capabilities.

As it is appreciated that the spacing, inclination angle, and width are all dependent on one another to effectively block any straight-line trajectory from entering the spacing between adjacent horizontal louvers along the height of the mud flap, in certain instances, the inclination angle may be altered between adjacent horizontal louvers to prevent (block) the straight-line trajectory from entering the spacing between the adjacent horizontal louvers. In particular exemplary instances, the inclination angle by which the width extends for each horizontal louver of the plurality of horizontal louvers decreases with increasing vertical position within the array in the direction of the mud flap height, which may or may not be combined with increased spacing between adjacent horizontal louvers and/or altering the widths of the horizontal louvers with increasing vertical positioning of the horizontal louvers along the mud flap height. In altering the widths, in certain instances, the width of each horizontal louver increases with increasing vertical position within the array in the direction of the mud flap height.

It is appreciated that strengthening members may extend between adjacent horizontal louvers to provide structural integrity and durability. These strengthening members may extend in any direction desired. For example, in particular instances, a plurality of elongate strengthening members extend primarily in the vertical direction, that is, in the direction of the mud flap height, across the plurality of horizontal louvers, where each elongate strengthening member of the plurality of elongate strengthening members extends between two or more horizontal louvers of the plurality of louvers. These vertical strengthening members may or may not be combined with other strengthening members in any desired arrangement. For example, in certain instances the plurality of elongate strengthening members are arranged in a honeycomb arrangement.

Optionally, in addition to the herein described barrier section, an aerodynamic section may also be included elevationally above the barrier section, although it is appreciated that an aerodynamic section as described herein may be incorporated into a traditional mud flap, where the barrier section may or may not include any openings extending through its thickness. The aim of the aerodynamic section is to minimize frontal area (surface or cross-sectional area) that impedes air flow by providing as much void (opening/spacing) for air to flow through during vehicle operation so to provide improved aerodynamic mud flap performance. In instances when a mounting section is provided, the mounting section may be arranged at any location suitable for its intended purpose. In certain instances, for example, it is arranged above the aerodynamic section.

The aerodynamic section includes a plurality of elongate members, with adjacent elongate members within the plurality being spaced apart by a desired distance. In certain instances, the amount of frontal see-through spacing is greater than the frontal see-through spacing of the barrier section. More narrowly, it can be said that an average frontal see-through spacing between adjacent elongate members in the aerodynamic section is greater than an average frontal see-through spacing between adjacent horizontal louvers in the barrier section. This increase in frontal see-through spacing may be achieved by increasing the spacing between adjacent elongate members and/or by altering an inclination angle by which the widthwise extension (the width) of each elongate member is biased relative to a forward direction (that is, the direction of the mud flap thickness). For example, in certain instances, the spacing between adjacent elongate members within the aerodynamic section are greater than the spacing between adjacent horizontal louvers in the barrier section. In certain instances, the spacing adjacent elongate members within the aerodynamic section is 0.5 inches or greater, and in more specific instances, 0.5 to 0.7 inches. These spacing dimensions identified are measured in the direction of the mud flap height, or, stated differently, in a direction normal to the direction of the mud flap thickness (the direction of minimum mud flap thickness).

It is appreciated that each elongate member of the plurality of elongate members in the aerodynamic section has a width and a thickness, the width of each elongate member extending perpendicular to the thickness of the elongate member and being greater than the thickness of the elongate member. Both the width and the thickness extend perpendicular to a length of the elongate member. The width extends at an inclination angle relative to a direction of the mud flap thickness. In certain instances, this inclination angle is zero, such that the width extends in a direction normal to the front side of the mud flap. In such instances, the spacing between adjacent elongate members is more fully exposed, unlike the spacing between horizontal louvers in the barrier section, which are arranged to prevent the passing of certain matter through the spacing between adjacent horizontal louvers. In other instances, the inclination angle may be minimized, such as ranging from 10 to −10 degrees or to substantially zero (0) degrees. In yet other instances, if knowing the direction of the air flowing into the aerodynamic section, the inclination angle may be altered such that the width extends in a substantially parallel with a particular direction of air flow to more fully expose the spacing between adjacent elongate members to the air flow.

It is appreciated that each elongate member in the aerodynamic section may be arranged in any manner desired suitable for the intended purpose of the aerodynamic section. In particular, it is appreciated that a length of the elongate member may extend lengthwise in any desired direction. For example, in certain instances, the length of each elongate member of the plurality of elongate members extends primarily in the vertical direction of the mud flap, that is, in the direction of the mud flap height, where adjacent elongate members within the plurality of elongate members are spaced apart in a direction of the mud flap width. By extending primarily in the vertical direction, the bending stiffness in the aerodynamic section is increased, which is beneficial for better resisting the propensity for the mud flap to bend in this area arranged elevationally above the barrier section and close to the mounting section. This is due to the bending moment created by impacts and aerodynamic forces occurring at lower parts of the mud flap within the barrier section. The mud flap is effectively a cantilevered structure, where the mounting section forms a base of the cantilevered structure about which portions of the mud flap may bend and rotate. It follows that the further a force is applied along the cantilevered structured (that is, along the mud flap) from the base, a greater bending moment is generated acting about the base. Therefore, for this reason, the mud flap will observe higher bending forces along the mud flap, such as at locations nearest the mounting section, due to forces being applied closer to its bottom further from the mounting section. For these reasons, adapting the aerodynamic section to provide increased bending resistance by way of an increased bending modulus would provide a mud flap that would better remain in a downwardly extended orientation during vehicle operation.

As with the barrier section, the aerodynamic section may include strengthening members extending across adjacent elongate members. In certain instances, these strengthening members may be elongate in form so to minimize any impact on aerodynamic performance, and may be arranged in any manner contemplated for the plurality of elongate members, except that the strengthening members must be arranged to intersect adjacent elongate members. For example, in certain instances a plurality of elongate strengthening members extend across the plurality of elongate members in the aerodynamic section, where each elongate strengthening member of the plurality of elongate strengthening members in the aerodynamic section extends between two or more elongate members of the plurality of elongate members. In more particular instances, by example, the plurality of elongate strengthening members in the aerodynamic section forms a honeycomb arrangement. Additional strengthening members may also be employed in the aerodynamic section as may be needed to maintain structural integrity and durability.

Further embodiments of this disclosure include methods of using any mud flap described herein on a vehicle adjacent a tire/wheel assembly.

For example, in certain instances, a method of using a mud flap on a vehicle having a tire/wheel assembly includes providing a mud flap in a mounted position on the vehicle adjacent to the tire/wheel assembly. The mud flap is configured to intercept and deflect matter being projected by the tire/wheel assembly from an outer circumference of the tire/wheel assembly and along any of a plurality of linear trajectory paths tangent to the outer circumference of the tire when the tire/wheel assembly is in rotation during vehicle operation. The mud flap is also configured to permit the passage of air flow through the mud flap during vehicle operation to prevent the generation of elevated aerodynamic drag. The mud flap has a height, a width, and a thickness, such as has previously been described herein. The mud flap thickness can be described as being defined by a front side and a rear side of the mud flap, the front side facing the tire/wheel assembly and configured to engage the matter being projected by the rotating tire/wheel assembly. The rear side also forms an outlet for the passage of air flow through the mud flap in its entirety. It certain instances, the mud flap thickness is defined by a pair of parallel planes each forming one of the front and rear sides of the mud flap. The mud flap also includes a barrier section configured to intercept and deflect matter projected from an outer circumference of the tire when rotating during vehicle operation. The barrier section includes a plurality of horizontal louvers, such as has been generally described herein, where the horizontal louvers have a length extending primarily in a direction of the mud flap width. The spacing between adjacent horizontal louvers within the plurality of horizontal louvers increases with increasing height of the mud flap, that is, as the plurality of horizontal louvers are arranged positionally higher in elevation within the array and along the mud flap height. Each horizontal louver has a width and a thickness as generally described herein, such that a centerline of the horizontal louver thickness extends longitudinally at an inclination angle relative to a direction of the mud flap thickness or to a horizontal plane, such that a bottom of the horizontal louver partially faces downward and partially faces the front side of the mud flap. This centerline generally extends in the direction of the mud flap with. This inclination angle may range from of 0 to 50 degrees, by way of example, or by any other range disclosed herein. In particular embodiments, for each horizontal louver arranged positionally higher in elevation within the array, the angle by which the centerline of the horizontal louver thickness is oriented relative to the mud flap thickness remains substantially constant with increasing height of the mud flap in certain instances, or, in other embodiments, may decrease with increasing height. It is appreciated that the array may or may not include all horizontal louvers arranged within the mud flap, as certain adjacent horizontal louvers may substantially be of the same size, shape, and orientation. In any event, the plurality of horizontal louvers are configured to intercept and deflect matter greater than a minimum size traveling along any linear trajectory path from the outer circumference of the tire/wheel assembly towards the front side of the mud flap while substantially maximizing the spacing between adjacent louvers to minimize aerodynamic drag.

In certain instances, where for the matter to be projected from the tire/wheel assembly along a linear trajectory path towards the front face of the mud flap in the mounted position, adjacent horizontal louvers for the plurality of horizontal louvers are arranged such that a line tangent to the outer circumference of the tire/wheel assembly (the tangent line representing one possible linear trajectory path) first intersects an exterior surface of a first horizontal louver of adjacent horizontal louvers, such as at longitudinal centerline of the first horizontal louver thickness, and thereafter intersects a longitudinal centerline of a thickness of a second horizontal louver arranged adjacent to and elevationally higher than the first horizontal louver. In such arrangements where the line intersects an exterior surface of the first horizontal louver, the line can be said to intersect a front or front half of the first horizontal louver, such as a front edge associated with a front half of the louver width, for example. As noted previously, a front or front half is arranged closest to a front side of the mud flap while a rear or rear half is arranged closest to the rear side of the mud flap. In these instances, when intersecting the first horizontal louver, the line intersects the exterior surface without extending into the thickness of the first horizontal louver, such as when the line is tangent to the exterior surface, for example. Along the longitudinal centerline of the second horizontal louver thickness, the tangent trajectory line either intersects an exterior surface of the second horizontal louver, is spaced apart from the second horizontal louver, or intersects the second horizontal louver. In such arrangements where the line intersects an exterior surface of the second horizontal louver, it can be said that the line intersects a rear or rear half of the second horizontal louver, such as a rear edge associated with a rear half of the louver width, for example. In these instances, when intersecting the second horizontal louver, the line intersects the exterior surface without extending into the thickness of the second horizontal louver, such as when the line is tangent to the exterior surface, for example. In particular instances, in being spaced apart from the aligned arrangement (where the trajectory line would intersect the exterior surface or trailing edge of the second horizontal louver without extending into the second horizontal louver thickness), the tangent trajectory line is located up to 3.81 mm (0.15 inches) from the aligned arrangement and the trailing edge of the second horizontal louver in a direction perpendicular to the line. In particular instances the thickness of each horizontal louver is substantially the same for each louver within the plurality of louvers, but each may vary as desired in other instances. Optionally, the thickness of each horizontal louver may vary along the width of the horizontal louver, such as when forming an airfoil, for example. Other mud flap variations as discussed herein may be employed in any of these embodiments. For example, in particular instances, the width of each horizontal louver is 0.25 to 1 inch, or in more particular instances, substantially 0.375 inches, and the inclination angle by which the widthwise extension of each horizontal louver is biased relative to a horizontal plane ranges from 0 to 50 degrees, or in more particular instances from 15 to 45 degrees or an angle of substantially 30 degrees. In such instances, the mud flap may be installed a particular distance between the mud flap and the tire, such as distance from 4 to 10 inches, or, in more particular instances, from 6 inches to 8 inches. Also, in these instances, the spacing between adjacent horizontal louvers varies from 0.1 and 0.2 inches at the bottom of the array to 0.35 to 0.45 inches at the top of the array.

Certain exemplary embodiments are discussed below in association with the figures.

Figure 1:
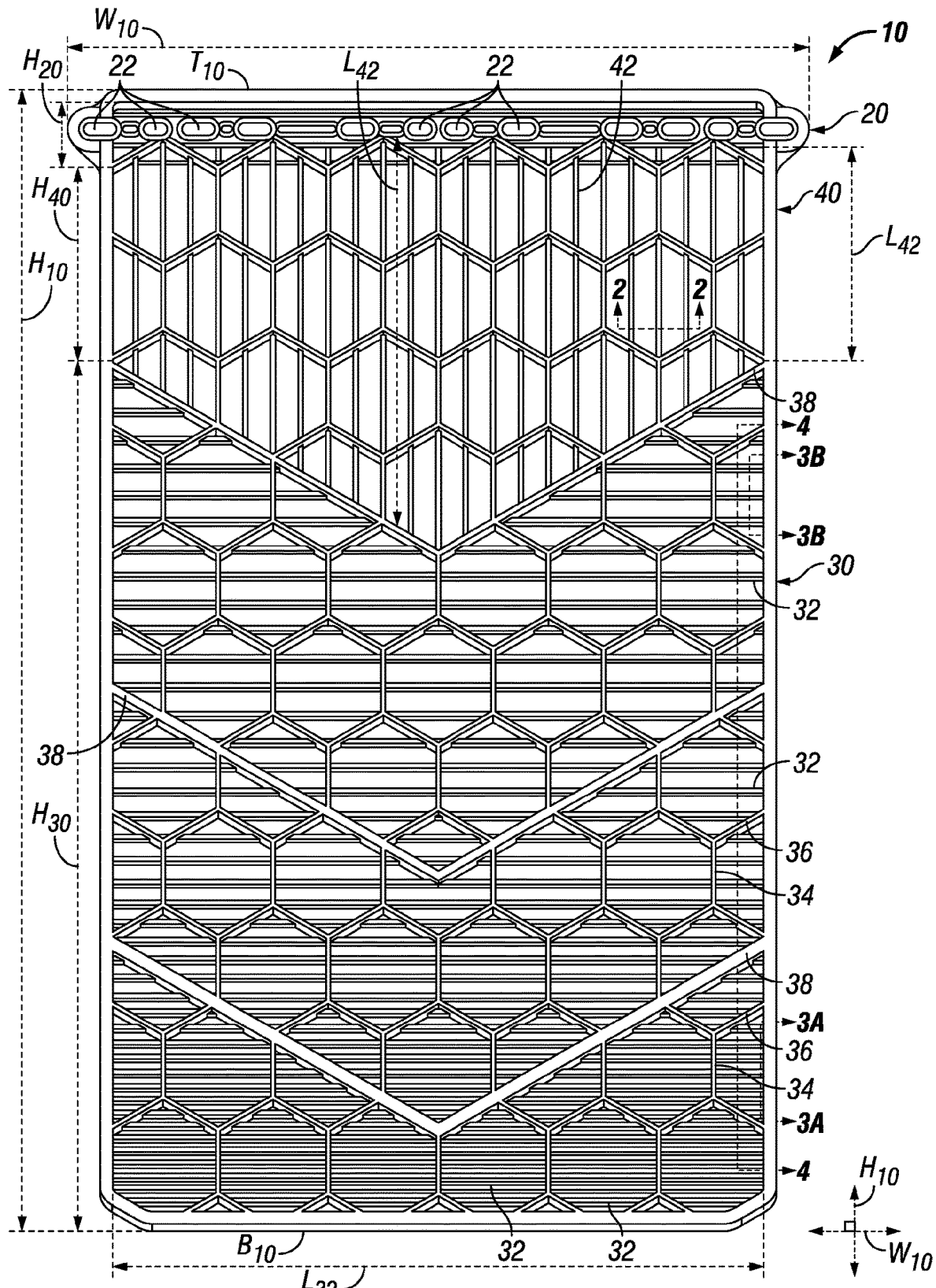
FIG. 1 is a front view of a mud flap in accordance with one embodiment of the disclosure.
Figure 4:
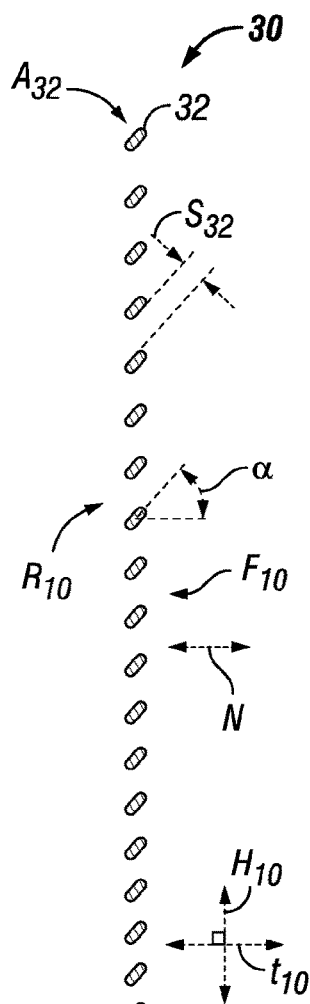
FIG. 4 is a elevational side sectional view of a vertical arrangement of horizontal louvers taken along line 4-4 in FIG. 1, showing a progressively increasing spacing between louvers with increasing height along the mud flap.

With reference to FIG. 1, a mud flap in accordance with an exemplary embodiment is shown. In particular, the mud flap 10 has a height $H_{10}$, a width $W_{10}$, and a thickness $t_{10}$ (see FIG. 4, as not shown in FIG. 1, but note the thickness extends into the page perpendicular to both the height $H_{10}$ and width $W_{10}$). The thickness $t_{10}$ can be described as being less than each of the height $H_{10}$ and width $W_{10}$, and in particular instances, substantially less than each of the height $H_{10}$ and width $W_{10}$. With reference to FIG. 4, the mud flap thickness $t_{10}$ extends from a front side $F_{10}$ to a rear side $R_{10}$ of mud flap 10.

In the embodiment shown in FIG. 1, mud flap 10 includes a mounting section 20, a barrier section 30, and an aerodynamic section 40. Barrier section 30 and aerodynamic section 40 and are each located below mounting section 20, while aerodynamic section 40 is located between mounting section 20 and barrier section 30, all in relation to mud flap height $H_{10}$. It can also be said that mounting section 20, having height $H_{20}$, barrier section 30, having height $H_{30}$, and aerodynamic section 40, having height $H_{40}$, are each arranged at different heights $H_{20}$, $H_{30}$, $H_{40}$ along height $H_{10}$ of mud flap 10. Mud flap height $H_{10}$ extends between mud flap bottom Bio and mud flap top $T_{10}$, where "above" and "higher" indicate an elevational direction or bias towards top $T_{10}$, while "below" and "lower" indicate an elevational direction or bias towards bottom Bio. Mounting section 20 is located near top $T_{10}$ of mud flap 10, where top $T_{10}$ defines the maximum height of mud flap 10 in an elevational sense opposite bottom Bio. It is appreciated that mounting section 20 is configured to facilitate mounting of mud flap 10 to a vehicle. Aerodynamic section 40 is configured to maximize airflow through mud flap 10, while barrier section 30 is configured to permit air flow through mud flap 10 while also being configured to intercept and deflect matter discharged rearward from a forward rotating tire during vehicle operation, such as, for example, road debris, stones, and water.

With continued reference to FIG. 1, mounting section 20 includes mounting features 22, configured to facilitate attachment of the mud flap to a mounting structure on a vehicle, where any mounting feature may form a recess or aperture. When a mounting section is included in any mud flap contemplated herein, it is appreciated that any mounting section may be employed, where such mounting section may employ the use of any known desired features, if at all, to facilitate installation of the mud flap onto a vehicle.

With continued reference to FIG. 1, barrier section 30 includes a plurality of horizontal louvers 32, each horizontal louver 32 forming an elongate member having a length $L_{32}$ extending primarily in a direction of mud flap width $W_{10}$. Primarily in a direction of the mud flap width $W_{10}$ means a direction biased less than 45 degrees relative to the direction of mud flap width $W_{10}$. In barrier section 30, the plurality of horizontal louvers 32 are spaced apart in the direction of mud flap height $H_{10}$ in the form of an array. This can also be observed in FIG. 4, showing in cross-section a plurality of horizontal louvers arranged within an array $A_{32}$ from FIG. 1. The spacing between adjacent horizontal louvers 32 is identified as $S_{32}$.

With continued reference to FIG. 1, while horizontal louvers 32 are spaced apart to promote improved aerodynamic performance, horizontal louvers 32 are also oriented and arranged to prevent any notable see-through (opening) for any desired matter travelling along a straight-line, rearward trajectory path that has been rotationally thrown from a forward-rotating tire. This straight-line trajectory path P, with reference now to FIGS. 5 and 6, forms a line tangent to the outer surface of tire 50 of a tire/wheel assembly in a direction of tire rotation R. With additional reference to FIG. 4, the spacing $S_{32}$ between adjacent horizontal louvers 32 within the array $A_{32}$ increases as the elevational position of each horizontal louver 32 within the array is arranged higher along mud flap height $H_{10}$ and barrier section height $H_{30}$. Spacings $S_{32}$ also represent elongate openings and passages. This is most clearly shown when comparing the spacing $S_{32}$ between adjacent horizontal louvers 32 shown in FIGS. 3A and 3B, where in FIG. 3A adjacent horizontal louvers 32 are arranged closer to mud flap bottom Bio and therefore are spaced closer together than horizontal louvers 32 shown in FIG. 3B, which are arranged closer to mud flap top $T_{10}$ than horizontal louvers 32 of FIG. 3A. It can be stated that the average spacing $S_{32}$ increases with increasing horizontal louver location along height $H_{10}$ of mud flap 10 for all horizontal louvers 32 arranged within barrier section 30, which accounts for minor deviations from the generally increasing spacing arise within the array $A_{32}$. For example, in certain variations, the spacing $S_{32}$ between adjacent horizontal louvers 32 approximately forming the bottom 10% and approximately the top 10% of horizontal louvers 32 shown in barrier section 30 are spaced equally, while the plurality of horizontal louvers arranged between the approximately bottom 10% and top 10% are arranged with increased spacing $S_{32}$ as the horizontal louvers 32 are positionally arranged closer to top $T_{10}$. This is because more narrowly spacing the approximately bottom 10% of horizontal louvers 32 would not have been reasonably effective and because more widely spacing the approximately top 10% of horizontal louvers 32 would have risked compromising the mud flap structural integrity without adding additional strengthening members or making other design changes. Also, more widely spacing the approximately top 10% of horizontal louvers 32 may have exceeded a maximum spacing for effective barrier functionality.

Figure 5:
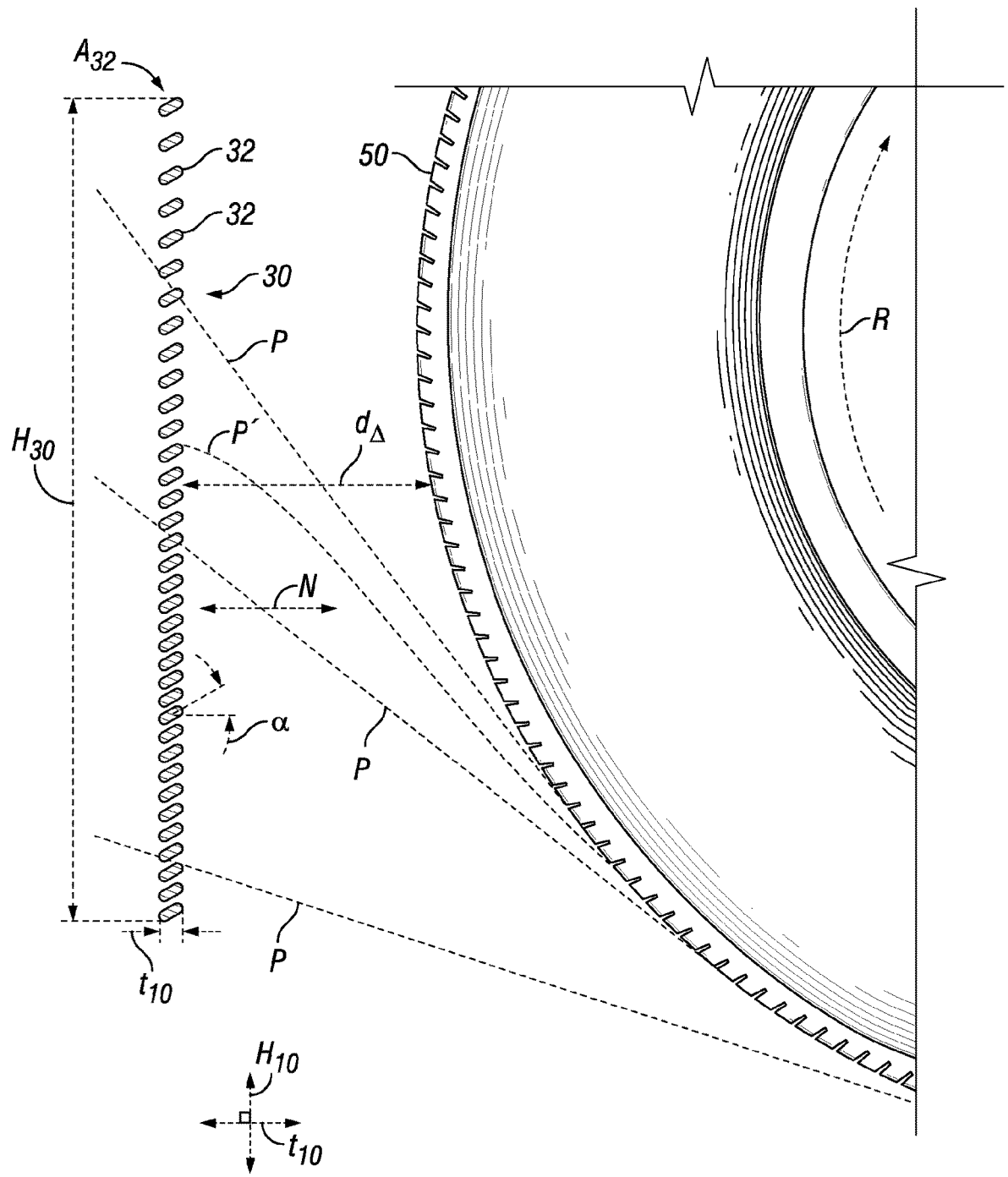
FIG. 5 is a side elevational view of a rotating tire and the sectional view of the vertical arrangement of horizontal louvers shown in FIG. 4, showing the trajectory of matter being thrown rearward from a forward rotating tire; and, FIG. 6 is an expanded side view of FIG. 5, also showing a bottom of a trailer.
Figure 6:
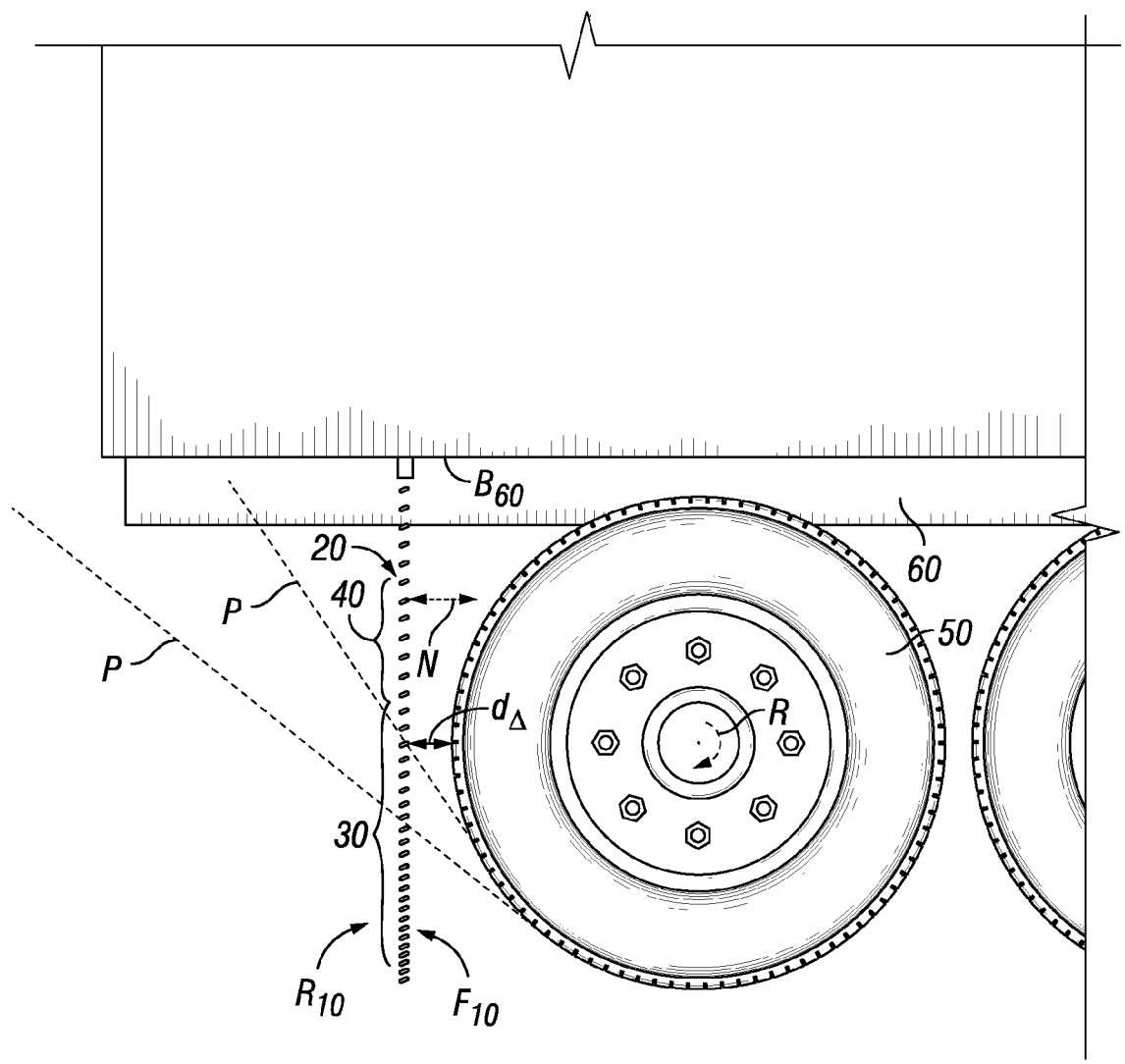

With reference to FIGS. 4 and 5, in addition to providing increased spacing $S_{32}$ between adjacent horizontal louvers 32 with increased elevation within the array, horizontal louvers 32 are oriented in a biased arrangement relative to the direction of the mud flap thickness $t_{10}$, or, described differently, biased relative to horizontal, by inclination angle α for the purpose of directing the bottom $B_{32}$ of each horizontal louver 32 directionally closer to being normal to a linear trajectory path P and/or arcuate trajectory path P' of matter that may be thrown rearward from the forward-rotating tire 50, where inclination angle α is greater than zero degrees. Thereby, any see-through opening is eliminated between adjacent horizontal louvers 32 that otherwise would be sufficient for matter to pass when traveling along trajectory path P.

Figure 3A:
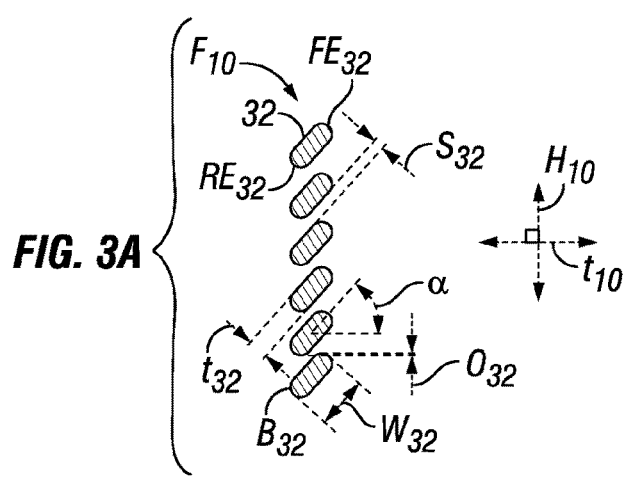
FIG. 3A is a elevational side sectional view of horizontal louvers taken along line 3A-3A in FIG. 1.
Figure 3B:
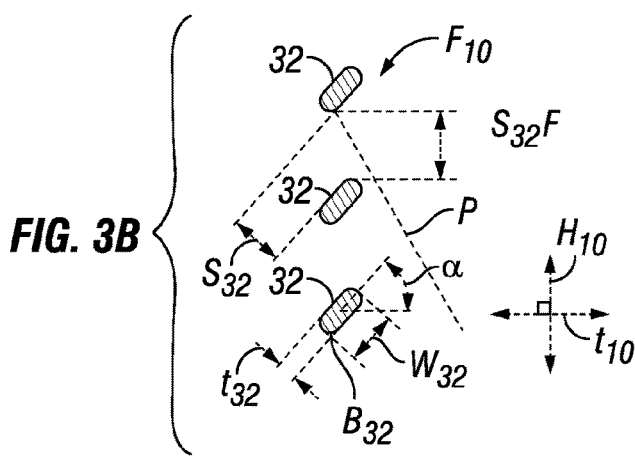
FIG. 3B is a elevational side sectional view of horizontal louvers taken along line 3B-3B in FIG. 1.
Figure 7:
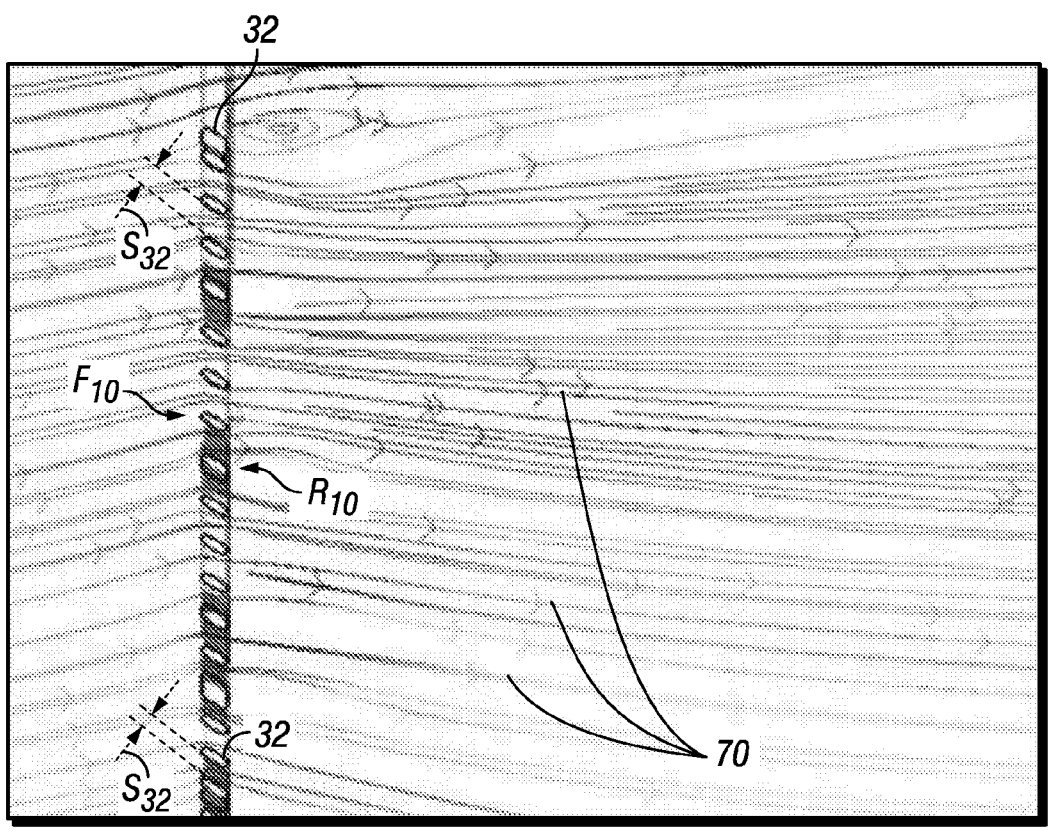
FIG. 7 is a diagram showing downward air flow through the array of horizontal louvers shown in FIG. 4.

To describe this biased orientation more specifically, with specific reference to FIGS. 3A and 3B, each horizontal louver 32 within the array can be described as having a width $W_{32}$ and a thickness $t_{32}$, the width $W_{32}$ being greater than the thickness $t_{32}$ and extending perpendicular to the thickness $t_{32}$. Both the width $W_{32}$ and the thickness $t_{32}$ extend perpendicular to the horizontal louver length $L_{32}$ (see FIG. 1), where the width $W_{32}$ extends at an inclination angle α relative to the direction of the mud flap thickness $t_{10}$ or, more generally, relative to horizontal (that is, a direction or plane parallel to the ground plane). Stated differently, width $W_{32}$ extends partially in a direction of the mud flap height $H_{10}$ and partially in a direction of the mud flap thickness $t_{10}$. By doing so, a bottom $B_{32}$ (bottom side) of horizontal louver 32 partially faces a front side $F_{10}$ of mud flap 10, where front side $F_{10}$ of mud flap 10 is intended to face a rear side of tire 50 to eliminate any see-through opening that otherwise would allow matter to pass between the adjacent horizontal louvers 32 along trajectory path P. In other variations, adjacent horizontal louvers 32 are arranged with some permissible see-though opening representing a maximum see-through opening to prevent matter sized greater than the see-through opening to pass between the adjacent horizontal louvers 32 along trajectory path P. It is appreciated that while trajectory path P is linear in the embodiment shown, an arcuate trajectory path P' (shown as dashed line in FIG. 5) may be employed when configuring the spacing of adjacent horizontal louvers 32. In any event, in any embodiment contemplated, with reference to FIG. 7, any matter permitted to pass through a spacing $S_{32}$ between adjacent horizontal louvers 32 may be directed downwardly towards a ground surface due to the downwardly directed passage (at its downstream exist from the back side of the mud flap) formed by spacing $S_{32}$ between adjacent horizontal louvers 32 as the matter passes through spacing $S_{32}$ and the corresponding downward direction of air flowing 70 through spacing $S_{32}$. It is noted that as spacings $S_{32}$ become narrower at lower elevations of the mud flap, the downward direction by which air flow travels upon exiting the mud flap increases. It is further noted that while inclination angle α may change between adjacent horizontal louvers 32, in the exemplary embodiment shown, inclination angle α remains constant between adjacent horizontal louvers 32 throughout the array $A_{32}$ of horizontal louvers 32. These results were also achieved using a barrier section comprised of horizontal louvers arranged in the various embodiments described in association with Eqns. 1 and 2 below, and as otherwise described herein.

With reference to FIG. 3A, due to the inclination angle α by which the widthwise extension of each horizontal louver 32 is biased relative to the direction of the mud flap thickness $t_{32}$ and due to the closer spacing $S_{32}$ needed at lower locations along barrier section 30 to block matter cast along trajectory path P (see FIG. 4) from passing between adjacent horizontal louvers 32, a front edge $FE_{32}$ (a leading edge), or more generally a front, of a first horizontal louver 32 is arranged elevationally higher than a rear edge $RE_{32}$ (a trailing edge), or more generally a rear, of a second horizontal louver 32, as is represented by overlap $O_{32}$. This may not always occur, such as when the spacing $S_{32}$ between adjacent horizontal louvers 32 increases with increasing elevational position along mud flap height $H_{32}$, such as is shown by example in FIG. 3B. Each of the front and front edge $FE_{32}$ is arranged along a front half of the horizontal louver associated with a front half of the louver width $W_{32}$ while each of the rear and rear edge $RE_{32}$ is arranged along a rear half of the horizontal louver width $W_{32}$. The front half is arranged closest to a front side $F_{10}$ of the mud flap 10 while the rear half is arranged closest to the rear side $R_{10}$ of the mud flap 10.

With reference to FIGS. 4 and 5, it is appreciated that each of the inclination angle α by which the horizontal louver width $W_{32}$ is biased relative to the direction of the mud flap thickness $t_{10}$ and the spacing $S_{32}$ by which adjacent horizontal louvers 32 are spaced, as is sufficient to prevent matter from passing between adjacent horizontal louvers 32 along a linear trajectory path P, and/or arcuate trajectory path P', may change depending upon the distance de separating tire 50 and mud flap 10 in its installed position (as intended). As noted herein, the inclination angle α for each horizontal louver 32 and its width $W_{32}$ may remain substantially constant or vary between louvers 32 within the plurality of horizontal louvers. By way of example, the plurality of horizontal louvers 32 shown in FIGS. 3A-11 show a horizontal louvers 32 having widths biased relative to horizontal by an inclination angle α, which is substantially the same (that is, equal or constant) between adjacent louvers 32, and for all louvers 32, within the plurality of louvers 32. By further example, with reference to FIG. 12, variation in inclination angle α is shown within the plurality of horizontal louvers 32, where the inclination angle α changes between adjacent louvers 32. In this instance, the inclination for each louver 32 decreases with increasing elevational position along the mud flap height $H_{10}$. It is appreciated that the spacing between adjacent louvers may vary or may remain the same within the array or more generally within the plurality of louvers. It is noted that in other instances, inclination angle α may not change between each pair of adjacent louvers within a plurality of horizontal louvers 32. For example, while the trend may be for inclination angles α to decrease (or increase) with increased elevational position along the mud flap height $H_{10}$, there may be adjacent louvers within an array of louvers 32 where the inclination angle α does not substantially change (that is, remains constant). It is noted that inclination angles α may be measured along a linear centerline $CL_{32}$ of the louver thickness, such as is shown in FIGS. 3A-11 or along an average linear centerline $\overline{CL}_{32}$ as exemplarily shown in FIG. 13. FIG. 13 shows horizontal louvers having asymmetrical thicknesses, such that the centerline of each thickness centerline extends along a non-linear path. A linear average centerline $\overline{CL}_{32}$ may be obtained by generating a linear curve fit for the non-linear centerline $CL_{32}$, such as by performing a linear regression of the non-linear centerline $CL_{32}$. It is from this linear average centerline $\overline{CL}_{32}$ an inclination angle may be measured relative to horizontal (that is, in a direction of the mud flap thickness or in a direction perpendicular to the mud flap height).

With reference again to FIG. 1, barrier section 30 includes a plurality of elongate strengthening members 34 extending between adjacent horizontal louvers 32 to provide structural integrity and durability to barrier section 30 and mud flap 10. These elongate strengthening members 34 extend primarily in the vertical direction, that is, in the direction of the mud flap height $H_{10}$, where each elongate strengthening member 34 of the plurality of elongate strengthening members extends between two or more horizontal louvers 32. These vertical strengthening members may or may not be combined with other strengthening members in any desired arrangement. While elongate strengthening members 34 could extend the substantial height $H_{30}$ of barrier section, in the example shown, additional elongate strengthening members 36 are provided to form a honeycomb arrangement of elongate strengthening members in combination with elongate strengthening members 34. Additional strengthening members may also be employed in the barrier section as may be needed to maintain structural integrity and durability, such as strengthening members 38, which extend across the width of the barrier section and at a bias thereto, and which form the shape of a chevron or "V".

With continued reference to the exemplary embodiment shown in FIG. 1, an aerodynamic section 40 is arranged above barrier section 30. Aerodynamic section 40 provides a reduced frontal area (that is, surface area or cross-sectional area) to increase air flow through mud flap 10, as it is located above barrier section 30 at a elevational location that does not require this portion of the mud flap 10 to operate as a barrier. This is because in such instances, with reference to FIG. 6, any matter extending along straight-line trajectory path P from tire 50 at the height of aerodynamic section 40 would, if passing through aerodynamic section 40, impact a bottom $B_{60}$ of vehicle 60, which in this embodiment is a trailer. Still, to provide a barrier for larger, more damaging objects, such as large stones, debris, or the like, and to also provide structural integrity for mud flap 10 as may be needed, aerodynamic section 40 as shown in FIG. 1 includes a plurality of elongate members 42, where adjacent elongate members 42 within the plurality of elongate members are spaced apart by a desired distance.

Figure 2:
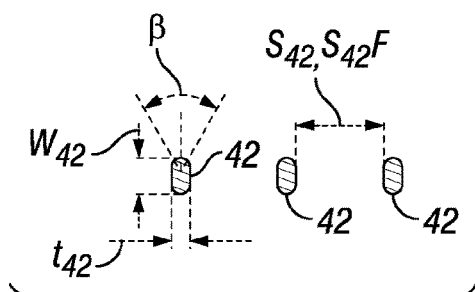
FIG. 2 is a elevational side sectional view of elongated members taken along line 2-2 in FIG. 1 within an aerodynamic section of the mud flap.

With reference to FIG. 1, as well as the cross-sectional view of certain elongate members 42 in FIG. 2, it is appreciated that each elongate member 42 in aerodynamic section 40 has a width $W_{42}$ and a thickness $t_{42}$, the width $W_{42}$ of each elongate member extending perpendicular to the thickness $t_{42}$ of the elongate member 42 and being greater than the thickness $t_{42}$ of the elongate member. Both the width $W_{42}$ and the thickness $t_{42}$ extend perpendicular to elongate member length $L_{42}$ (see FIG. 1). Width $W_{42}$ extends in the direction of the mud flap thickness $t_{10}$ (or, in other words, in a direction substantially normal to the front side $F_{10}$ of mud flap 10), such that the direction of width $W_{42}$ is substantially aligned in parallel with a direction normal N to mud flap front side $F_{10}$. By doing so, the spacing $S_{42}$ between adjacent elongate members 42 in aerodynamic section 40 is more fully exposed to air flow directed normal to the mud flap front side $F_{10}$, unlike the spacing $S_{32}$ between horizontal louvers 32 in barrier section 30 (see FIGS. 3A and 3B), which are arranged to prevent the passing of certain matter along trajectory path P through the spacing $S_{32}$ between adjacent horizontal louvers 32. It is appreciated that, if knowing the direction of the air flowing into the aerodynamic section, the elongate members may be twisted (biased or angled) so to more fully expose the spacing between adjacent elongate members to the particular air flow. Accordingly, in other variations, width $W_{42}$ may extend at a bias (at an angle (3 other than zero degrees) relative to the direction of mud flap thickness $t_{10}$. While each elongate member 42 in aerodynamic section 40 may be arranged in any manner desired, in the exemplary embodiment shown in FIG. 1, the length $L_{42}$ of each elongate member 42 extends lengthwise primarily in the vertical direction of mud flap 10, that is, in the direction of the mud flap height $H_{10}$, where adjacent elongate members 42 are spaced apart in the direction of the mud flap width $W_{10}$.

With reference to the exemplary embodiment shown in FIG. 2, the spacing $S_{42}$ between adjacent elongate members 42 in aerodynamic section 40 is shown in greater detail, where spacing $S_{42}$ also represents a frontal see-through spacing $S_{42}^F$. As can be observed, with additional reference to FIGS. 3A and 3B, the amount of frontal see-through spacing (opening) $S_{42}$ provided in the aerodynamic section 40 is, on average (by area), greater than the frontal see-through spacing (opening) $S_{32}F$ of barrier section 30. This increase in frontal see-through spacing between aerodynamic section 40 and barrier section 30 may be achieved by providing a lower angle by which the widthwise extension $W_{42}$ of any such elongate member in aerodynamic section 40 extends relative to the direction of the mud flap thickness $t_{10}$, or, stated differently, relative to a direction N normal to the front side $F_{10}$ of the mud flap (which can be described as a plane extending in the direction of the mud flap height $H_{10}$ and in the direction of the mud flap width $W_{10}$). Additionally or separately, the increase in frontal see-through spacing in aerodynamic section 40 relative to barrier section 30 may be achieved by simply providing a greater spacing $S_{42}$ between adjacent elongate members 42 that is greater than spacing $S_{32}$ between adjacent horizontal louvers 32.

As with barrier section 30, with continued reference to FIG. 1, aerodynamic section 40 includes strengthening members 44, which in the aerodynamic section 40 extend across adjacent elongate members 42. Strengthening members 44 are elongate in form so to minimize any impact on aerodynamic performance. While strengthening members 44 may be arranged in any manner desired, provided each at least extends across adjacent elongate members, in the exemplary embodiment shown, a plurality of elongate strengthening members 44 extend primarily in a direction of the mud flap width $W_{10}$. More specifically, a plurality of elongate strengthening members 44 are arranged in aerodynamic section 40 to form a honeycomb arrangement. Additional strengthening members may also be employed in the aerodynamic section as may be needed to maintain structural integrity and durability.

Figure 8:
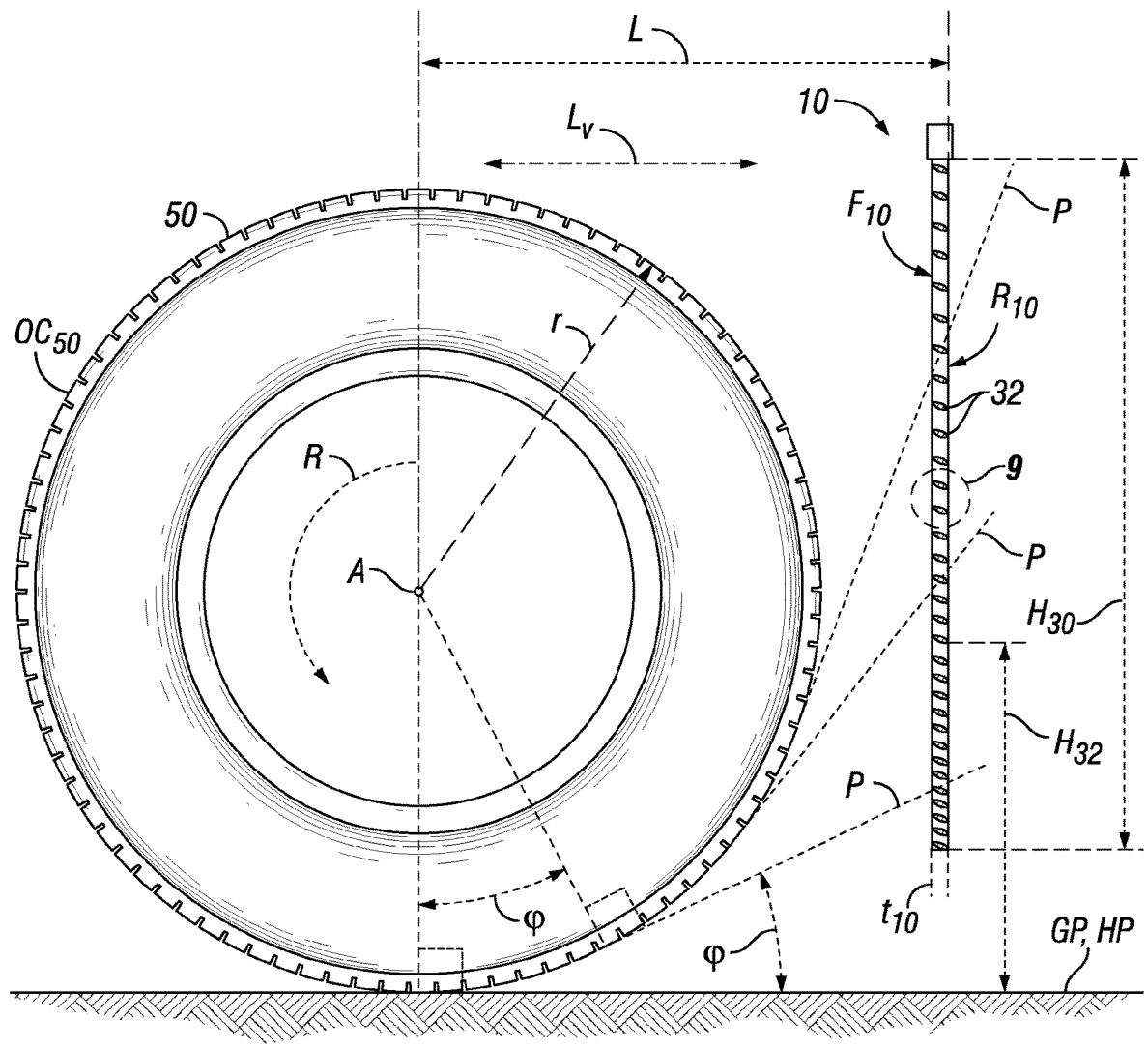
FIG. 8 is a side elevational view of a rotating tire and a sectional view of a plurality of horizontal louvers arranged in an array in a vertical arrangement.

With reference to FIG. 8, a rotating tire (or tire/wheel assembly) 50 is shown projecting matter along linear trajectory paths P in the direction of rotation R towards a front side $F_{10}$ of the mud flap 10. Each linear trajectory path P extends from an outer circumference $OC_{50}$ of the tire or tire/wheel assembly 50 and is tangent to said outer circumference $OC_{50}$. The outer circumference $OC_{50}$ of the tire/wheel assembly is defined by radius r. The ground plane is denoted as GP. Each linear trajectory path P is oriented by an angle φ relative to the ground plane GP or more generally relative to a horizontal plane HP. Mud flap 10 has a height $H_{10}$, a thickness $t_{10}$, and is mounted a particular distance from the tire, which can be described using distance L, which extends horizontally in a direction parallel to the ground plane GP or in a direction of the vehicle length Lv from a rotational axis A of the tire/wheel assembly 50 and to the rear side $R_{10}$ of the mud flap thickness $t_{10}$. It is noted that the spacing of adjacent louvers 32 within the barrier section increases with increasing vertical location along the mud flap height $H_{10}$. It is noted that the inclination angle (a) of each horizontal louver 32 (see FIGS. 9-11), which biases the width (widthwise extension) of a corresponding horizontal louver 32 relative to a horizontal or ground plane, remains constant amongst all louvers in the array. In this instance, with the front side $F_{10}$ and back side $R_{10}$ forming parallel planes, the width $W_{32}$ of each horizontal louver 32 remains constant, but may optionally vary between louvers 32, such as when increasing with increasing vertical location along the mud flap height H.

With reference to FIG. 9, which shows an enlarged portion of FIG. 8, adjacent horizontal louvers 32 within the barrier section are shown arranged such that the a point of intersection along an exterior surface of a front or leading edge $FE_{32}$ of a first horizontal louver $32_1$ (that is, an elevationally lower louver) is aligned with a point of intersection along exterior surface the trailing edge $RE_{32}$ of a second horizontal louver $32_2$ (that is, an elevationally higher louver) of the adjacent louvers along a linear trajectory path P, where neither point of intersection extends into the thickness of the corresponding louver. In doing so, the linear trajectory path P extends along a portion of the exterior surface associated with a front or front edge $FE_{32}$ of the first horizontal louver $32_1$ and along a portion of the exterior surface associated with a rear or rear edge $RE_{32}$ of the second horizontal louver $32_2$. Extending along a portion of the exterior surface associated with a front or front edge $FE_{32}$ may occur at an intersection of the thickness centerline $CL_{32}$ along a corresponding front edge $FE_{32}$ or at any other location along the front edge $FE_{32}$ or more generally along the front half of the louver width $W_{32}$ along the exterior surface of the louver. Likewise, extending along a portion of the exterior surface associated with a rear or rear edge $RE_{32}$ may occur at an intersection of the thickness centerline $CL_{32}$ along a corresponding rear edge $RE_{32}$ or at any other location along the rear edge $FE_{32}$ or more generally along the rear half of the louver width $W_{32}$ along the exterior surface of the louver. In FIGS. 3A-12, the front edges $FE_{32}$ and rear edges $RE_{32}$ are rounded and extend until reaching a top or bottom side of each corresponding louver. In other variations, any front or rear edge may be generally flat or planar or be pointed. In FIG. 13, the front edge $FE_{32}$ is rounded, and the rear edge $RE_{32}$ is generally pointed.

With reference again to FIG. 9, linear trajectory path P of matter projected from a rotating tire is inclined by an angle φ relative to a horizontal plane HP. Each horizontal louver width $W_{32}$ is biased by angle α relative to a horizontal plane HP, while Y is the vertical component of louver width $W_{32}$ and X is the horizontal component of louver width $W_{32}$.

In particular embodiments, a desired arrangement between adjacent horizontal louvers can be determined using particular equations. Use of these equations permits one to determine a proper spacing between adjacent horizontal louvers to provide improved aerodynamic performance while also providing sufficient barrier capabilities.

In certain instances, to determine the vertical spacing of adjacent horizontal louvers within a barrier section of a mud flap, Eqn. 1 is provided below, whereby the spacing of adjacent horizontal louvers and the inclination angle (α) of each horizontal louver width increases with increasing vertical location along the mud flap height. F represents the distance by which adjacent horizontal louvers are spaced in the vertical direction such that the leading edge or point of intersection with an exterior surface along a front of a first horizontal louver is aligned with the trailing edge or point of intersection with an exterior surface along a rear of a second horizontal louver along one possible linear trajectory paths for matter projected from a rotating tire, such as is generally shown in FIG. 8, where the line along which alignment is arranged does not extend into the thickness of the corresponding louver. A first horizontal louver for a pair of adjacent louvers is the one of lowest elevation, such that it is the first louver of the pair approached along a linear trajectory path. It is also noted that in spacing apart adjacent horizontal louvers, vertical spacing F specifically extends between longitudinal centerlines of each corresponding louver width. Y represents a distance corresponding to the vertical component of louver width $W_{32}$, while X represents a distance corresponding to the horizontal component of louver width $W_{32}$. $\varphi$ represents the angle by which linear trajectory path P is oriented relative to ground plane GP or to a horizontal plane HP.

$$F = Y + X \cdot \tan \varphi \quad \text{(Eqn. 1)}$$

In utilizing Eqn. 1, with reference to FIG. 9, F includes two additive components, namely, Y and $X \cdot \tan \varphi$. In Eqn. 1, Y represents distance $F_1$ and the vertical height associated with first louver width $W_{32}$, while $X \cdot \tan \varphi$ represents distance $F_2$ and the vertical distance extending between the leading edge $FE_{32}$ or point of intersection with an exterior surface along a front of the first louver $32_1$ and the trailing edge $RE_{32}$ or point of intersection with an exterior surface along a rear of the second louver $32_2$ along trajectory path P. In sum, F is the sum of $F_1$ and $F_2$, which forms the distance extending from the first louver trailing edge $RE_{32}$ to the second louver $32_2$ trailing edge $RE_2$. Again, Eqn. 1 determines the location of a second, adjacent horizontal louver relative a first, adjacent horizontal louver to align the leading edge or point of intersection with an exterior surface along a front of the first louver with the trailing edge or point of intersection with an exterior surface along a rear of the second louver along a common line representing a possible linear trajectory path of matter from a rotating tire. This arrangement balances the compromise between aerodynamic and barrier performances.

A deviation from the aligned arrangement provided by Eqn. 1 may be achieved using Eqn. 2, provided below. Eqn. 2 provides a spacing (or offset) from the linear trajectory path use to align respective leading and trailing edges, or front and rear, of the first and second adjacent louvers. This is achieved by adding or subtracting a vertical spacing or offset component $S \cdot \sec \varphi$, S being the distance of offset desired in a direction perpendicular to the linear trajectory path used in Eqn. 1 to align the respective leading and trailing edges of adjacent louvers.

$$F = Y + X \cdot \tan \varphi \pm S \cdot \sec \varphi \quad \text{(Eqn. 2)}$$

For example, with reference to FIG. 10, a positive spacing S has been added, separating respective leading and trailing edges, or front and rear, of first and second adjacent louvers. This results in an increase in vertical spacing F beyond distances $F_1$ and $F_2$ as found in Eqn. 1 by $S \cdot \sec \varphi$, which is referred to as distance $F_{S+}$. This positive spacing S improves aerodynamic performance while permitting smaller, unconcerning matter equal to or less than spacing S to pass through the mud flap and between adjacent louvers along a linear trajectory path. By further example, with reference to FIG. 11, a negative spacing S has been added, which reduces the vertical distance F by $S \cdot \sec \varphi$, which is referred to as distance $F_{S-}$, to create an overlapped arrangement between the first and second adjacent louvers relative to the linear trajectory path P. While this overlapped arrangement may reduce aerodynamic performance due to the smaller spacing between adjacent louvers, the overlapped arrangement may prevent the passage of matter through the mud flap that otherwise would pass through the mud flap in the aligned arrangement. Also, the overlapped configuration may improve the barrier function of the mud flap to better intercept matter traveling along an arcuate trajectory path. Further, the overlapped arrangement may better deflect matter downward as it passes through the mud flap. It is noted that spacing S is different from the spacing $S_{32}$ described above in association with FIGS. 3A-4.

In particular embodiments, to balance the benefits and sacrifices to aerodynamic and barrier performances, S is in the range of ±0.15 inches or ±3.81 mm. Optionally, the width $W_{32}$ of each horizontal louver is 0.25 to 1 inch, or in more particular instances, substantially 0.375 inches, and the angle $\alpha$ by which the widthwise extension $W_{32}$ of each horizontal louver is biased relative to a horizontal plane HP ranges from 0 to 50 degrees, or in more particular instances from 15 to 45 degrees or an angle of substantially 30 degrees. In such instances, the mud flap may be installed a particular distance between the mud flap and the tire, such as distance from 4 to 10 inches, or, in more particular instances, from 6 inches to 8 inches. Also, in these instances, the spacing F between adjacent horizontal louvers varies from 0.1 and 0.2 inches at the bottom of the array to 0.35 to 0.45 inches at the top of the array. Surprisingly, when incorporating these design features into a mud flap, the water spray and mist were directed substantially downward, noticeable improving visibility for trailing vehicles.

In an effort to determine the height HL at which a first louver $32_1$ of a pair of adjacent louvers is located relative to a particular linear trajectory path P, Eqn. 3 is provided, where: r is the radius of the tire or tire/wheel assembly; L is horizontal distance from the tire/wheel assembly rotational axis A to the rear side of the mud flap; and $\varphi$ is the angle by which linear trajectory path P is oriented relative to ground plane GP or horizontal plane HP. In operation, the height HL of an intersection between trajectory path P and the rear side $R_{10}$ of the mud flap 10 is shown in FIG. 8, together with the additive components $H_1$ and $H_2$ for determining HL, where $H_1$ equals $(r - r \cdot \cos \varphi)$ and where $H_2$ equals $(L - r \cdot \sin \varphi) \cdot \tan \varphi$.

$$HL = [(r - r \cdot \cos \varphi) + (L - r \cdot \sin \varphi) \cdot \tan \varphi] \quad \text{(Eqn. 3)}$$

In evaluating the relationship between adjacent louver spacing F as provided by Eqns. 1 and 2 and the corresponding height HL of trajectory path P associated with each pair of aligned, adjacent horizontal louvers, it has been learned that the relationship is non-linear, as the spacing F increases at a higher rate relative to trajectory height HL. This is evidenced by the graph shown in FIG. 14, where $F_{min}$ corresponds to $F_{S-}$ and $F_{max}$ corresponds to $F_{S+}$. This is also true when evaluating the relationship between louver spacing F as provided by Eqns. 1 and 2 and the corresponding angle $\varphi$ of trajectory path P associated with each pair of aligned, adjacent horizontal louvers. This is evidenced by the graph shown in FIG. 15, where $F_{min}$ corresponds to $F_{S-}$ and $F_{max}$ corresponds to $F_{S+}$. Therefore, it can be said in these certain embodiments that the spacing F between adjacent horizontal louvers increases non-linearly and at a greater rate with increasing vertical location along the mud flap height. In other variations, a linear increase may be observed using different louver arrangements.

It is appreciated that any mud flap discussed herein may be installed on any contemplated vehicle adjacent to a tire, the tire being rotatably mounted to the vehicle for vehicle operation. In doing so, during vehicle operation, the mud flap performs as described herein.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A mud flap configured for installation in a mounted position on a vehicle adjacent a tire/wheel assembly to intercept and deflect matter being projected by the tire/wheel assembly from an outer circumference of the tire/wheel assembly and along any of a plurality of linear trajectory paths tangent to the outer circumference of the tire when the tire/wheel assembly is in rotation during vehicle operation and to permit the passage of air flow through the mud flap during vehicle operation to prevent the generation of elevated aerodynamic drag, the mud flap comprising:

a height, a width, and a thickness, where in the mounted position the height extends primarily in a vertical direction, the width extending perpendicular to the height, the thickness of the mud flap being defined by a front side and a rear side of the mud flap, the front side facing the tire/wheel assembly and configured to engage the matter being projected by the rotating tire/wheel assembly and the rear side forming an outlet for the passage of air flow through the mud flap;

a barrier section configured to intercept and deflect matter projected from an outer circumference of the tire when rotating during vehicle operation, the barrier section including a plurality of horizontal louvers and a plurality of vertical strengthening members, each horizontal louver comprising an elongate member having a length extending primarily in a direction of the mud flap width, where the plurality of horizontal louvers are spaced apart in the direction of the mud flap height in the form of an array, the spacing between adjacent horizontal louvers within the plurality of horizontal louvers increasing with increasing height of the mud flap, each vertical strengthening member of the plurality of vertical strengthening members comprising an elongate member having a length extending primarily in a direction of the mud flap height, where the plurality of vertical strengthening members are spaced apart in a direction of the mud flap width, where each horizontal louver has a width and a thickness, the horizontal louver width extending perpendicular to the horizontal louver thickness and both the horizontal louver width and the horizontal louver thickness extending perpendicular to a horizontal louver length, such that, for each horizontal louver, a centerline of the horizontal louver thickness extends longitudinally at an inclination angle relative to a direction of the mud flap thickness, where the inclination angle is substantially zero degrees to 50 degrees, and where the thickness of each horizontal louver within the plurality of horizontal louvers is substantially the same, and where each vertical strengthening member has a width and a thickness, the vertical strengthening member width extending perpendicular to the vertical strengthening member thickness and both the vertical strengthening member width and the vertical strengthening member thickness extending perpendicular to the vertical strengthening member length, where the plurality of horizontal louvers are configured to intercept and deflect matter of a minimum size traveling along any linear trajectory path from the outer circumference of the tire/wheel assembly towards the front side of the mud flap.

2. The mud flap of claim 1, where for the matter to be projected from the tire/wheel assembly along a linear trajectory path towards the front face of the mud flap in the mounted position, adjacent horizontal louvers for the plurality of horizontal louvers are arranged such that a line tangent to the outer circumference of the tire/wheel assembly when in the mounted position adjacent to the tire/wheel assembly first intersects an exterior surface of a first horizontal louver of adjacent horizontal louvers without extending into the first horizontal louver thickness and thereafter intersects a longitudinal centerline of a thickness of a second horizontal louver adjacent to and elevationally higher than the first horizontal louver, where in a direction perpendicular to the line, the line is located within 3.81 mm (0.15 inches) of a location where the line would intersect the second horizontal louver without extending the second horizontal louver thickness.

3. The mud flap of claim 2, where the line intersects an exterior surface of the second horizontal louver.

4. The mud flap of claim 2, where the line is spaced apart from the second horizontal louver.

5. The mud flap of claim 2, where the line intersects the second horizontal louver.

6. The mud flap of claim 1, where for each horizontal louver arranged positionally higher in elevation within the array, the inclination angle by which the centerline of the horizontal louver thickness is oriented relative to the mud flap thickness remains substantially constant with increasing height of the mud flap.

7. The mud flap of claim 1, where for the plurality of horizontal louvers, the inclination angle by which the centerline of each horizontal louver thickness is oriented relative to the mud flap thickness decreases with increasing elevational position along the height of the mud flap.

8. The mud flap of claim 1, where the thickness of each horizontal louver is substantially the same for each louver within the plurality of louvers.

9. The mud flap of claim 8, where the thickness of each horizontal louver varies along the width of the horizontal louver.

10. The mud flap of claim 1, where the mud flap thickness is defined by a pair of parallel planes each forming one of the front and rear sides of the mud flap.

11. The mud flap of claim 1, where the inclination angle ranges from 15 to 50 degrees.

12. The mud flap of claim 1, where the increase in spacing between adjacent horizontal louvers increases at a higher rate with increasing height along the mud flap, such that the increase in spacing is non-linear.

13. The mud flap of claim 12, where the spacing between adjacent horizontal louvers is determined by the following equation:

$$F = Y + X \cdot \tan \varphi \pm S \cdot \sec \varphi,$$

where Y represents a distance corresponding to a vertical component of a corresponding louver width, X represents a distance corresponding to a horizontal component of a corresponding louver width, φ represents the angle by which linear trajectory path is oriented relative to a ground plane or to a horizontal plane, and S representing a distance of spacing desired in a direction perpendicular to a corresponding linear trajectory path along which points of intersection with exterior surfaces of adjacent horizontal louvers are arranged.

14. The mud flap of claim 1, where the spacing between adjacent horizontal louvers within the plurality of horizontal louvers ranges from 0.1 to 0.5 inches.

15. The mud flap of claim 1, where an aerodynamic section is arranged above the barrier section, the aerodynamic section including a plurality of elongate members, where adjacent elongate members within the plurality of elongate members are spaced apart by a spacing, where the average spacing between adjacent elongate members in the aerodynamic section, as measured in a direction normal to the direction of elongate member length of one of the adjacent elongate members, is greater than the average spacing between adjacent horizontal members in the barrier section, as measured in a direction normal to the direction of horizontal member length of one of the adjacent horizontal members.

16. The mud flap of claim 15, where the plurality of elongate members in the aerodynamic section extend lengthwise in a direction biased to a lengthwise direction of the plurality of horizontal louvers of the barrier section.

17. The mud flap of claim 1, where the horizontal louver width is greater than the horizontal louver thickness.

18. The mud flap of claim 17, where a centerline of the horizontal louver thickness extends longitudinally at an inclination angle relative to a direction of the mud flap thickness, such that a bottom of the horizontal louver partially faces downward and partially faces the front side of the mud flap.

19. The mud flap of claim 1, further comprising mounting features located near the top of the mud flap.

20. A method of using a mud flap on a vehicle having a tire/wheel assembly comprising:

providing a mud flap in a mounted position on the vehicle adjacent to the tire/wheel assembly, the mud flap configured to intercept and deflect matter being projected by the tire/wheel assembly from an outer circumference of the tire/wheel assembly and along any of a plurality of linear trajectory paths tangent to the outer circumference of the tire when the tire/wheel assembly is in rotation during vehicle operation and to permit the passage of air flow through the mud flap during vehicle operation to prevent the generation of elevated aerodynamic drag, the mud flap being any mud flap recited in claim 1.

* * * * *